(12) United States Patent
Ozawa et al.

(10) Patent No.: US 10,051,164 B2
(45) Date of Patent: Aug. 14, 2018

(54) CAMERA AND ADAPTER

(71) Applicant: SONY CORPORATION, Tokyo (JP)

(72) Inventors: Kenichi Ozawa, Kanagawa (JP); Satoshi Moriyama, Kanagawa (JP); Junpei Yamauchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 26 days.

(21) Appl. No.: 15/108,341

(22) PCT Filed: Nov. 28, 2014

(86) PCT No.: PCT/JP2014/081521
§ 371 (c)(1),
(2) Date: Jun. 27, 2016

(87) PCT Pub. No.: WO2015/114933
PCT Pub. Date: Aug. 6, 2015

(65) Prior Publication Data
US 2016/0330353 A1 Nov. 10, 2016

(30) Foreign Application Priority Data
Jan. 30, 2014 (JP) ................................. 2014-015452

(51) Int. Cl.
*H04N 5/225* (2006.01)
*G03B 17/14* (2006.01)
*G03B 17/56* (2006.01)
*H04N 5/232* (2006.01)

(52) U.S. Cl.
CPC .......... *H04N 5/2254* (2013.01); *G03B 17/14* (2013.01); *G03B 17/566* (2013.01); *H04N 5/2252* (2013.01); *H04N 5/23209* (2013.01)

(58) Field of Classification Search
CPC ............. H04N 5/23209; H04N 5/2252; H04N 5/2254; G03B 17/14; G03B 17/566
See application file for complete search history.

(56) References Cited

U.S. PATENT DOCUMENTS

| | | | |
|---|---|---|---|
| 5,734,935 A * | 3/1998 | Imanari | G03B 17/14 396/529 |
| 2007/0047953 A1* | 3/2007 | Kawai | G03B 17/14 396/544 |
| 2010/0091175 A1* | 4/2010 | Shintani | G02B 7/365 348/345 |

(Continued)

FOREIGN PATENT DOCUMENTS

| | | |
|---|---|---|
| JP | 07-295053 A | 11/1995 |
| JP | 2007-058123 A | 3/2007 |
| JP | 2008-118199 A | 5/2008 |

(Continued)

*Primary Examiner* — Lin Ye
*Assistant Examiner* — John H Morehead, III
(74) *Attorney, Agent, or Firm* — Chip Law Group

(57) ABSTRACT

There is provided a camera that includes a body-side mount. The body-side mount includes a first reference plane, has a first flange back distance from the first reference plane to an imaging plane, and allows an adapter to be mounted on the first reference plane. The adapter includes a second reference plane, and has a second flange back distance from the second reference plane to the imaging plane. The second flange back distance is shorter than the first flange back distance.

19 Claims, 24 Drawing Sheets

(56) References Cited

U.S. PATENT DOCUMENTS

2011/0103789 A1\* 5/2011 Honjo .................... G02B 7/102
                                                            396/530
2014/0002676 A1\* 1/2014 Ning ........................ G02B 7/14
                                                            348/187

FOREIGN PATENT DOCUMENTS

| JP | 2010-160176 A | 7/2010 |
| JP | 2010-286733 A | 12/2010 |

\* cited by examiner

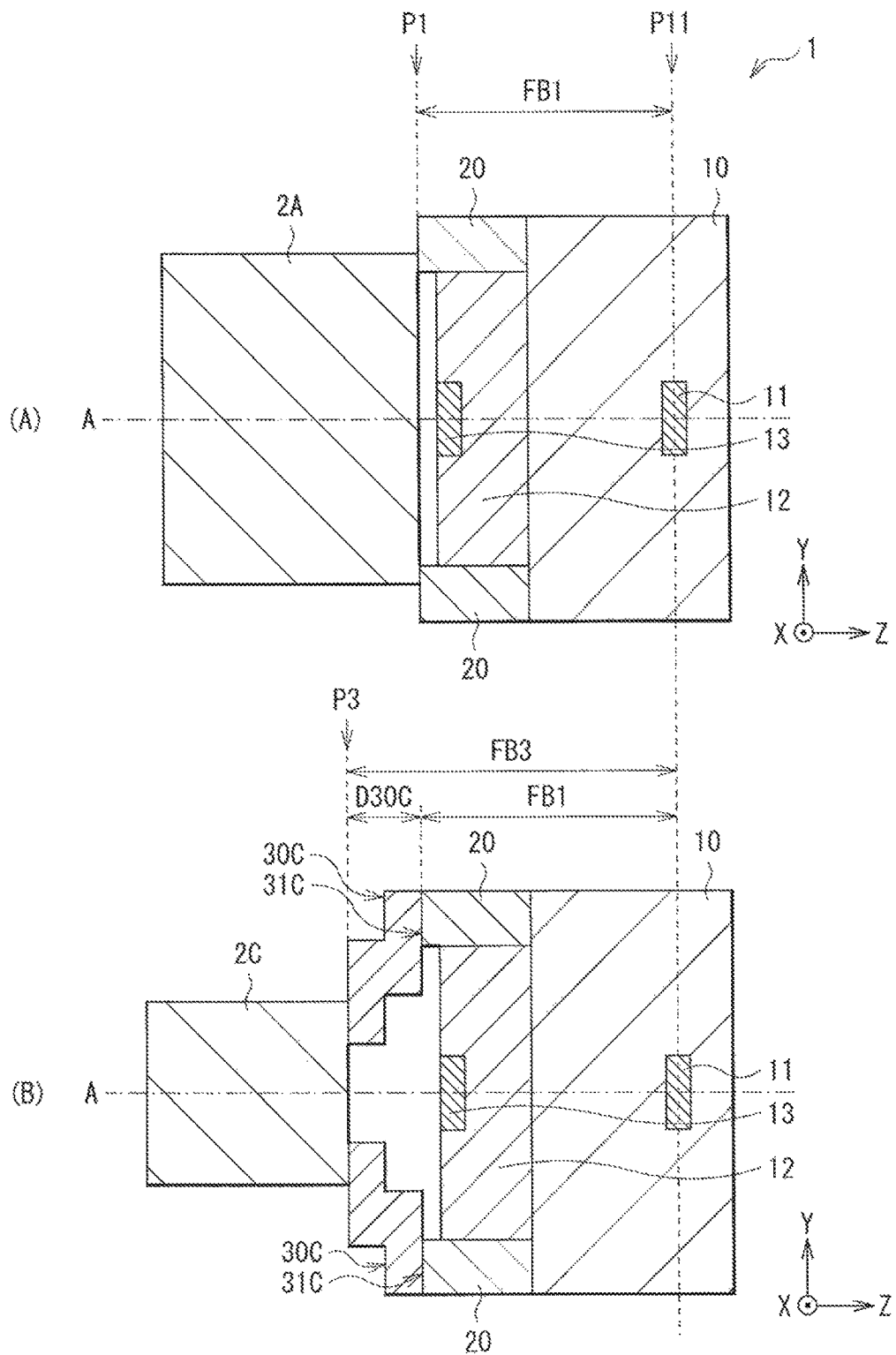
[FIG. 1]

[FIG. 2]
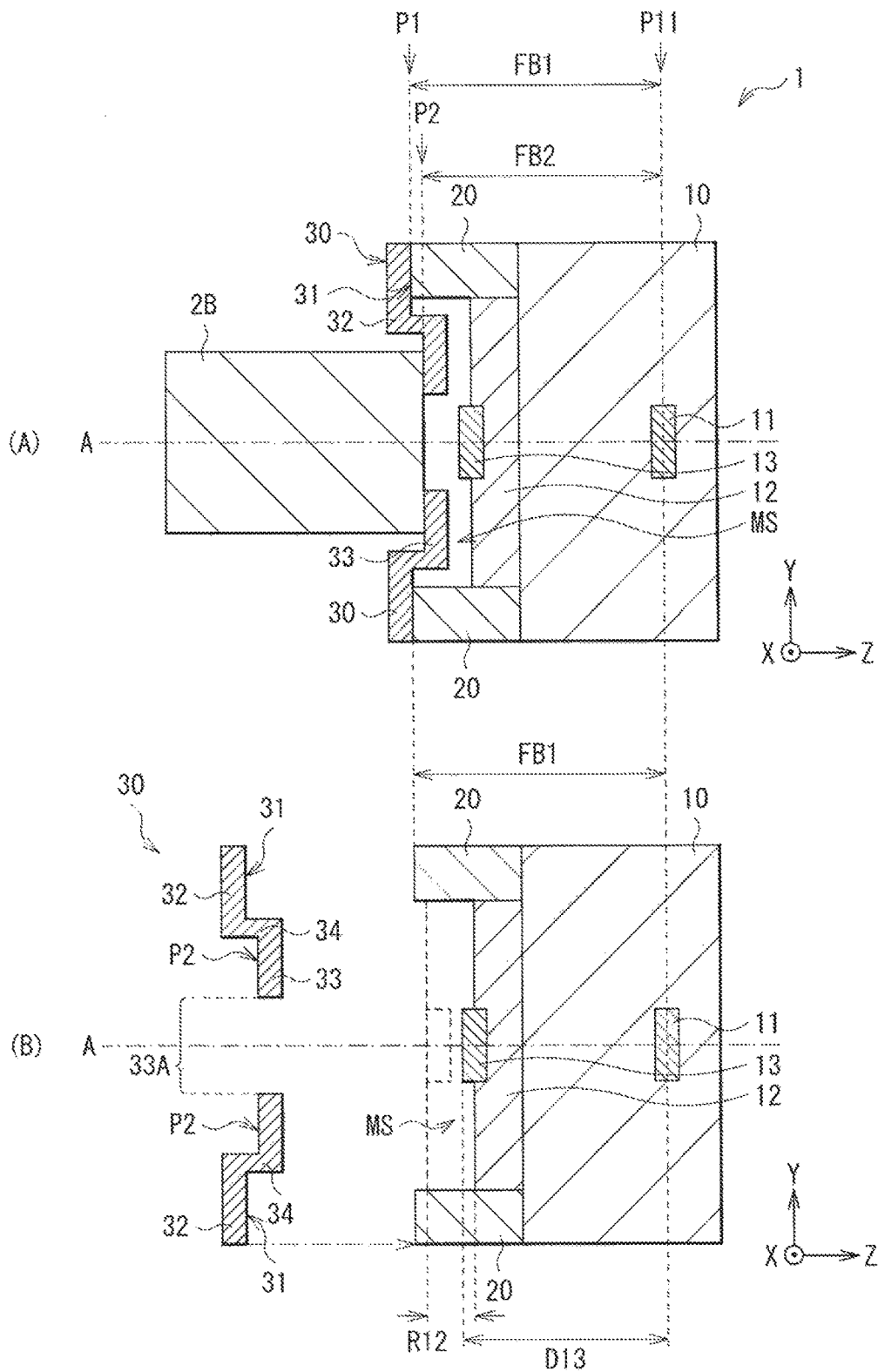

[FIG. 3]
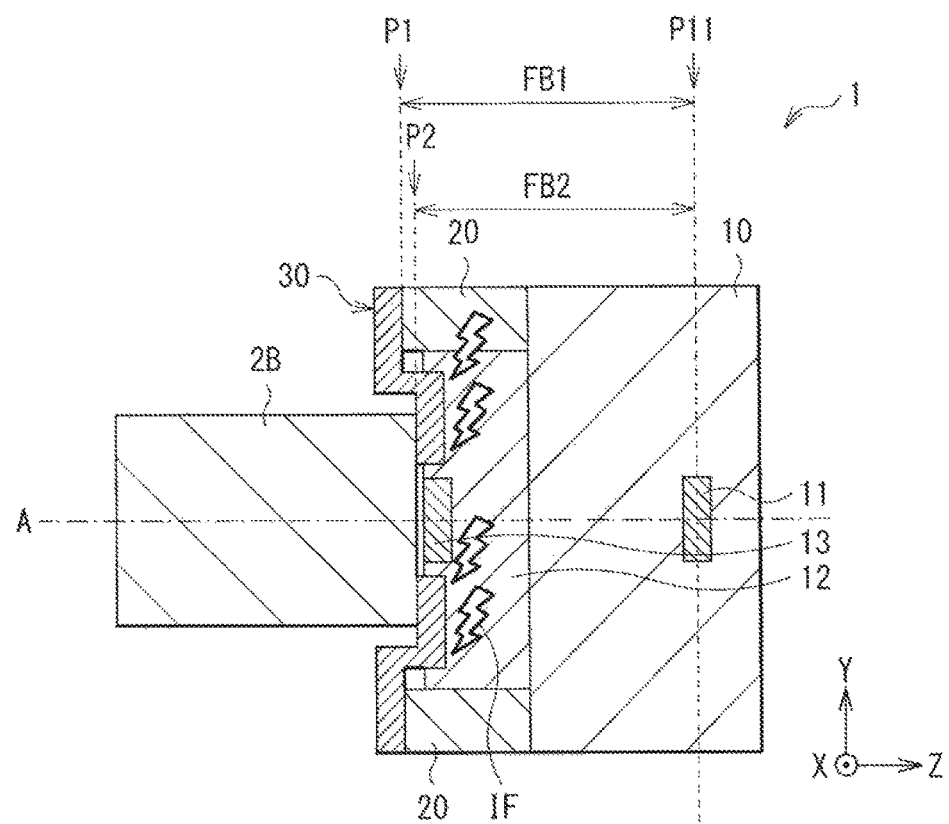

[ FIG. 4 ]
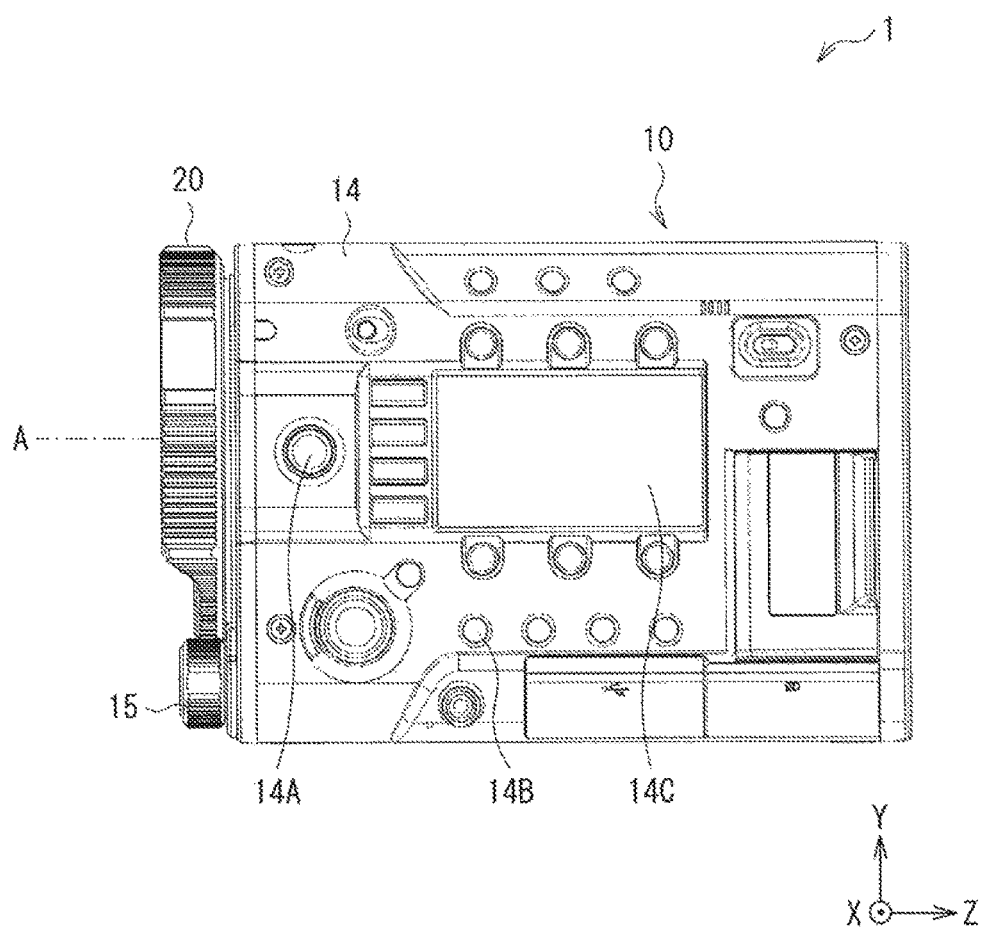

[ FIG. 5 ]
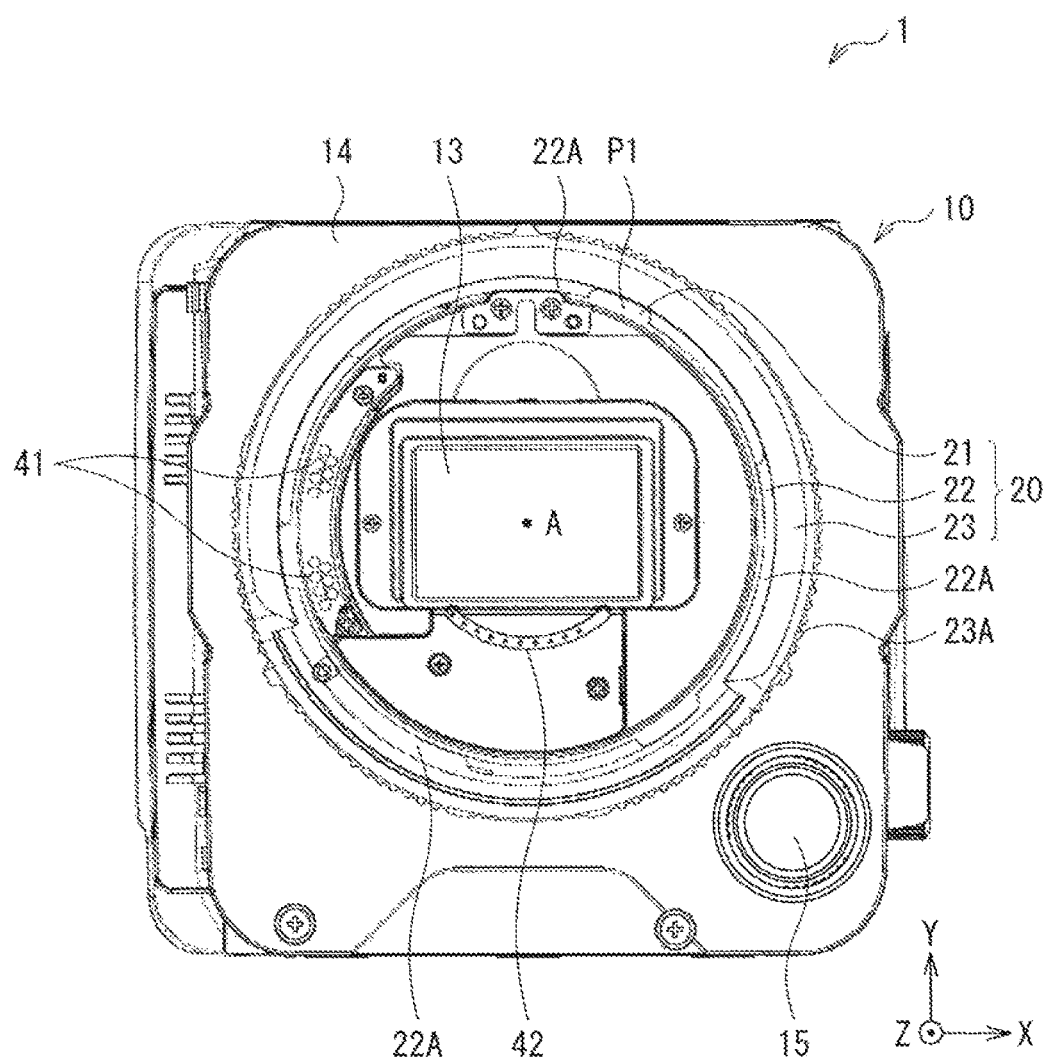

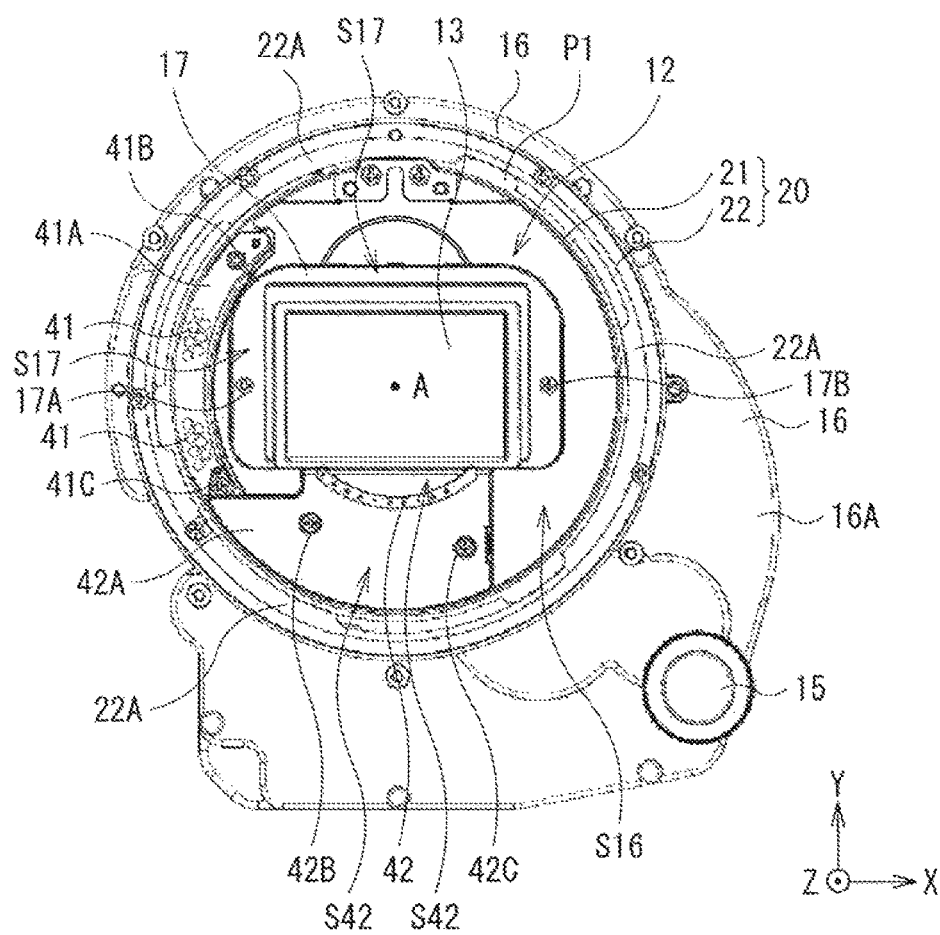
[FIG. 6]

[FIG. 7]
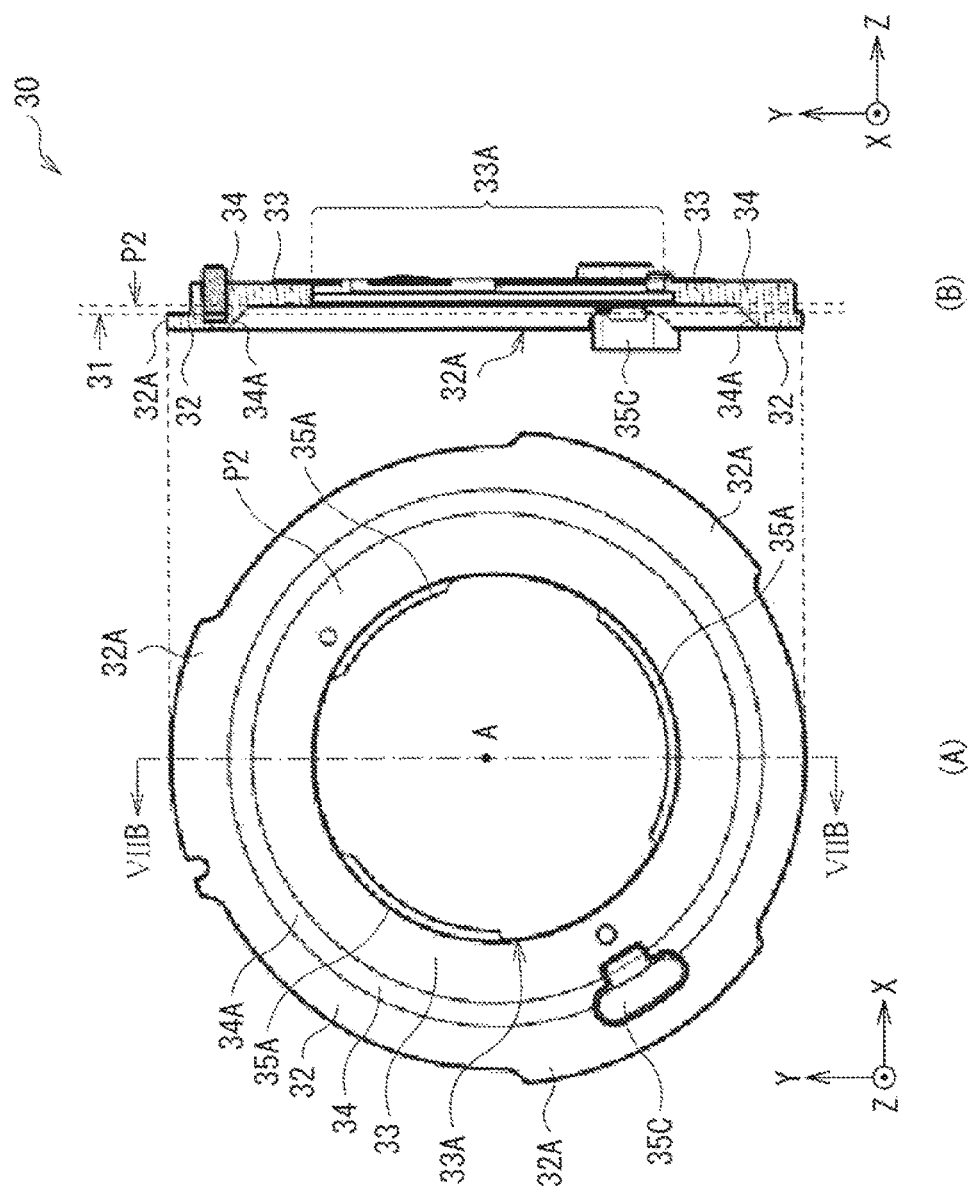

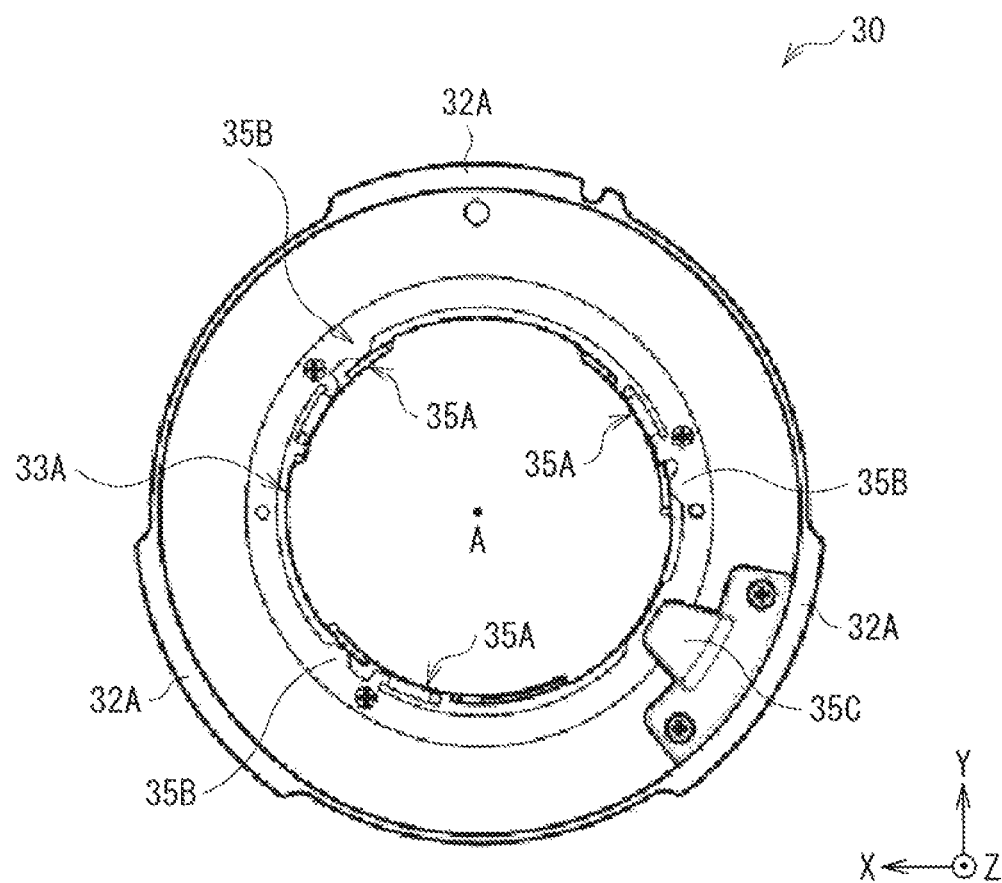
[FIG.8]

[ FIG. 9 ]
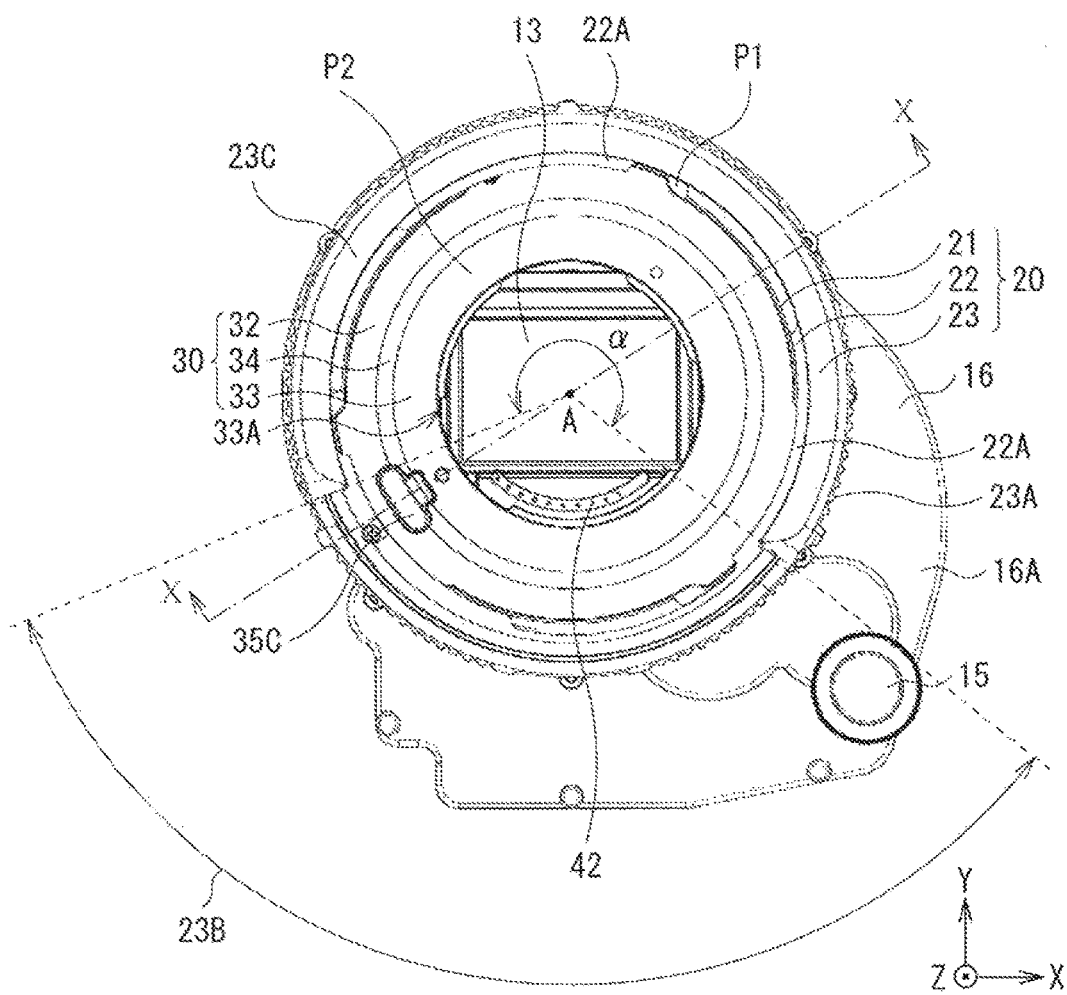

[ FIG. 10 ]
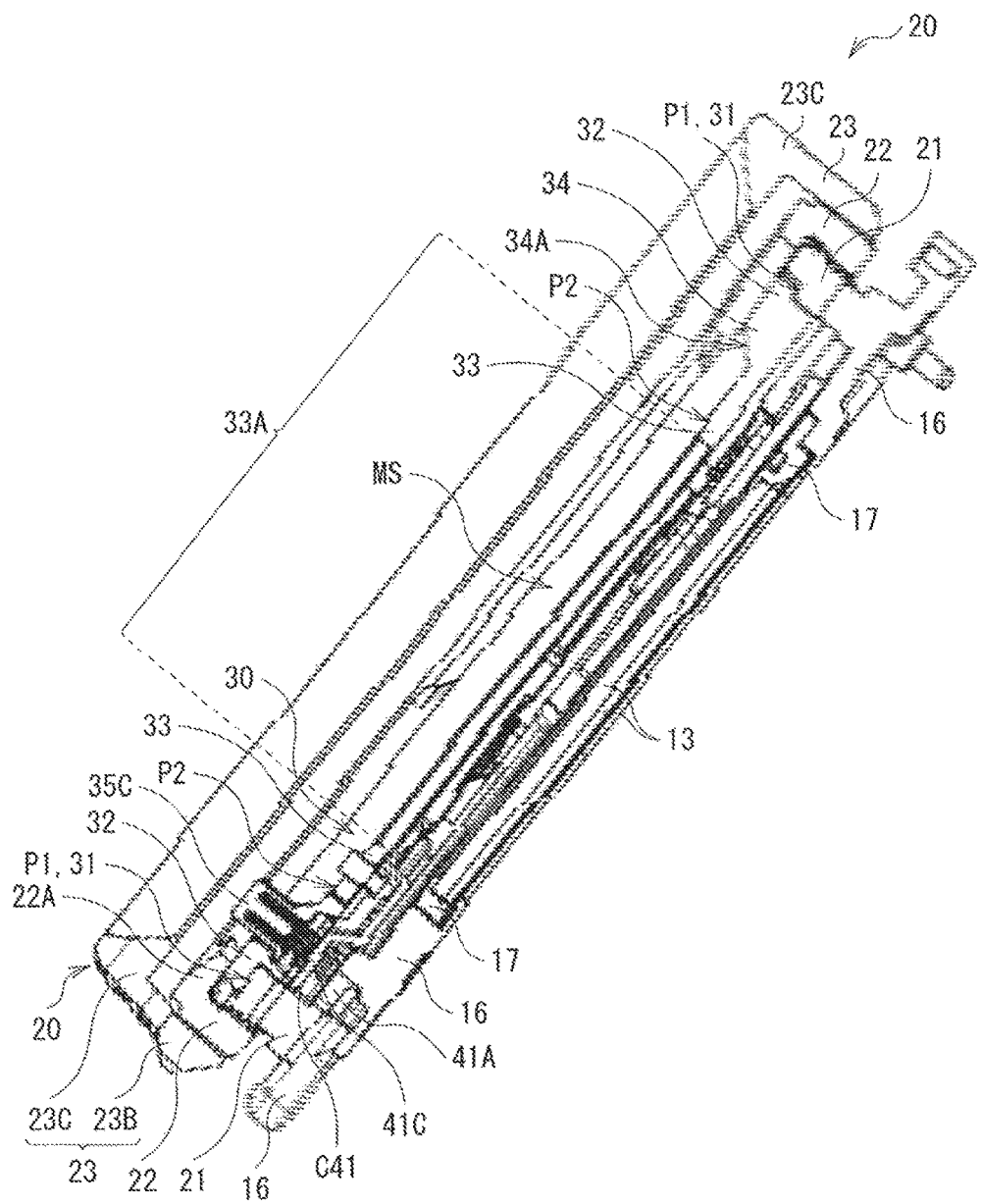

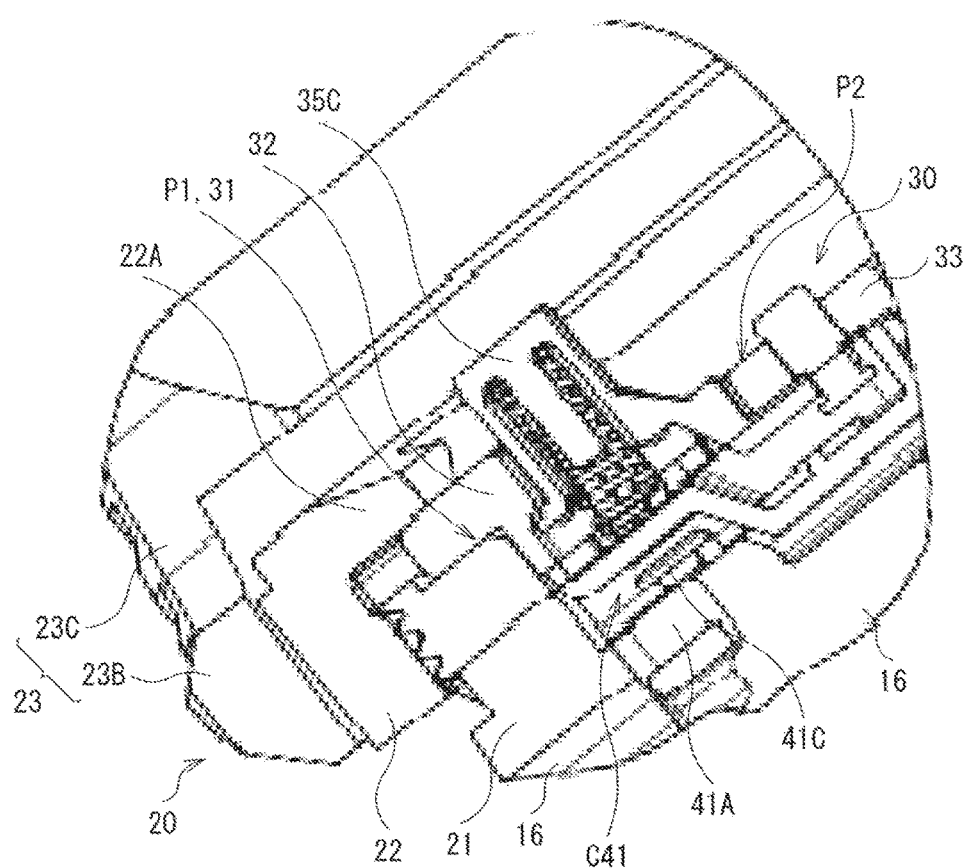
[ FIG. 11 ]

[FIG. 12]
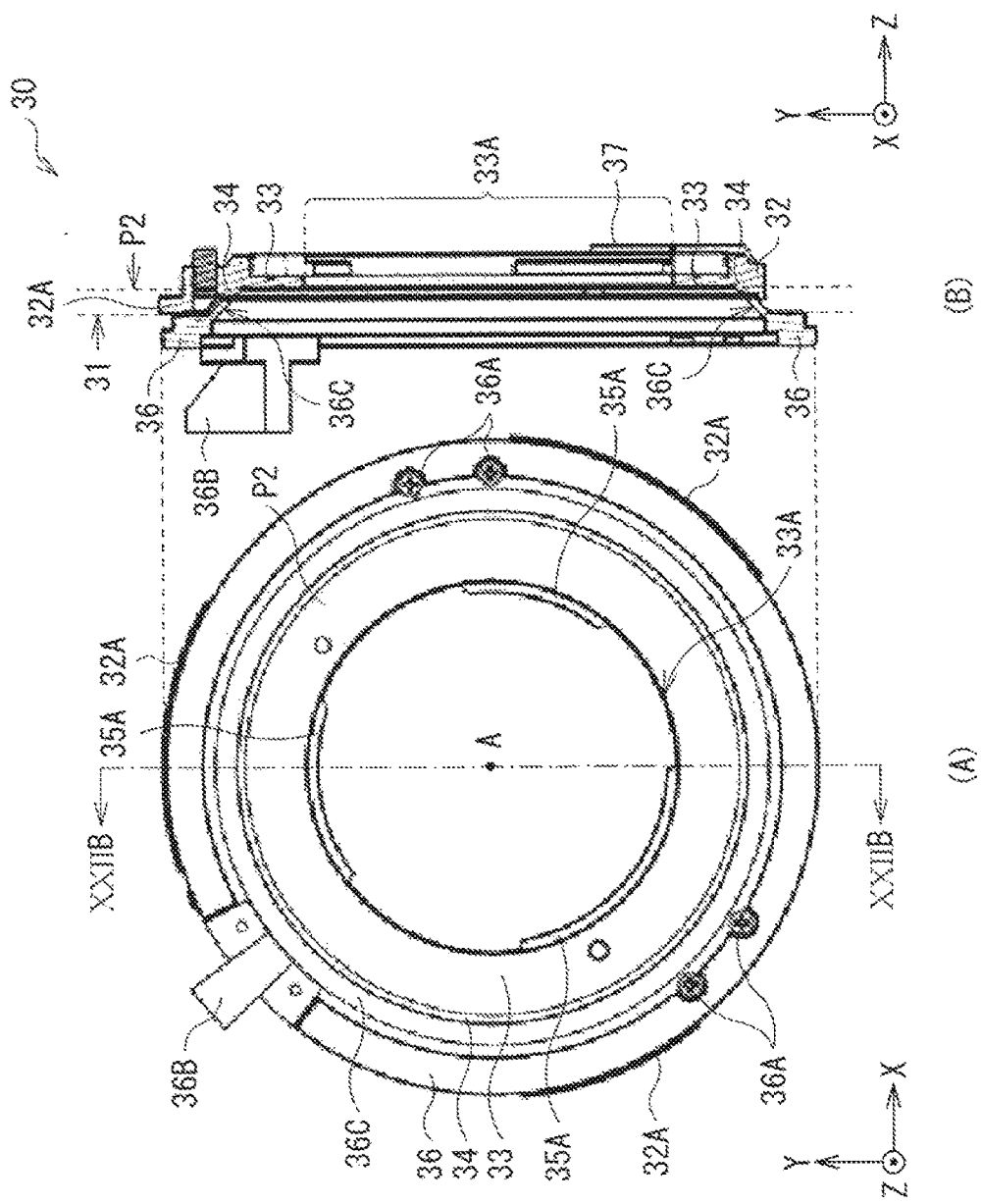

[ FIG. 13 ]
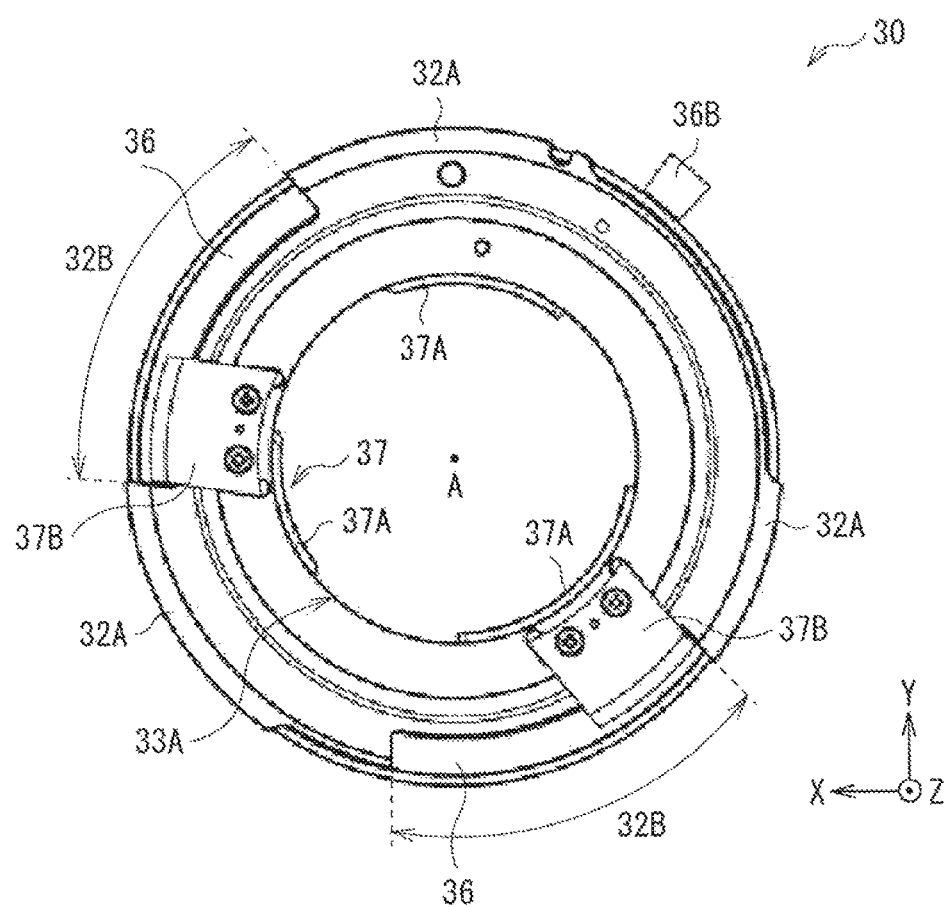

[FIG. 14]
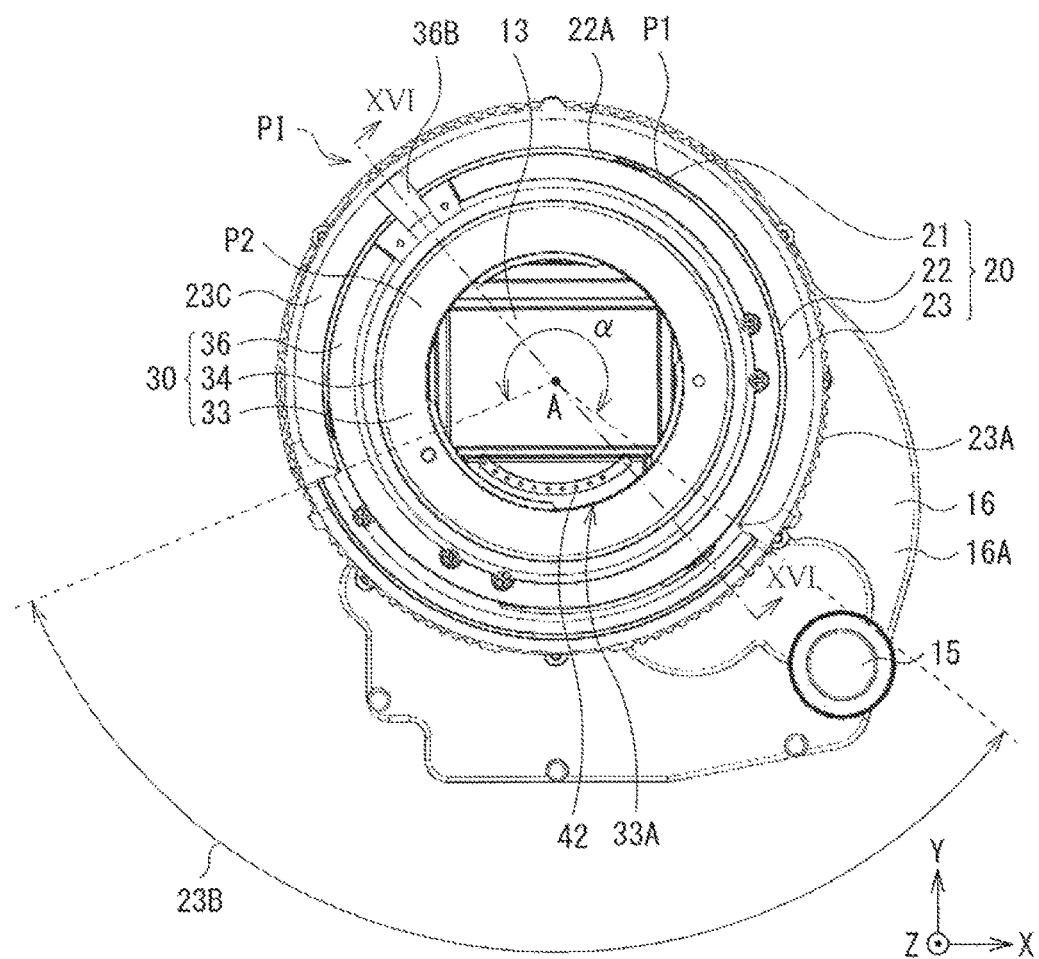

[FIG. 15]
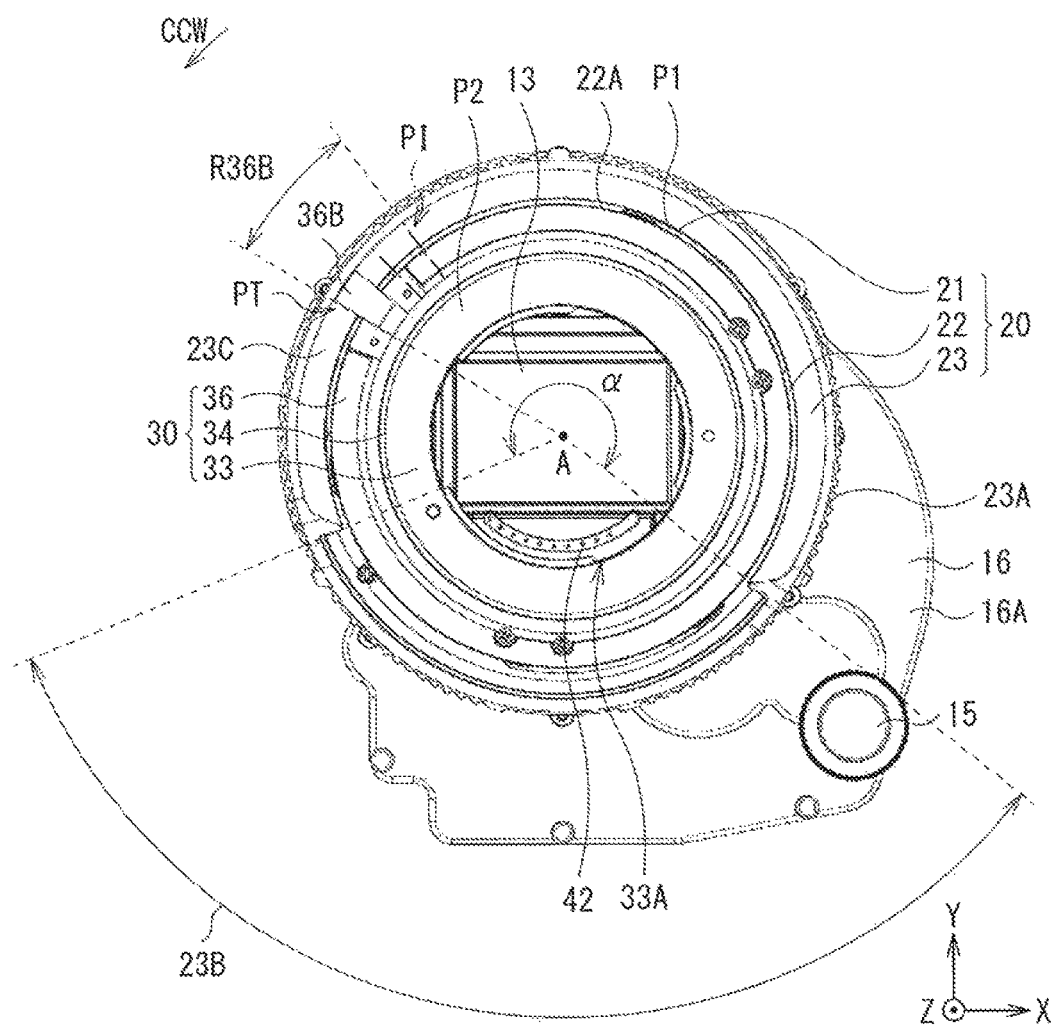

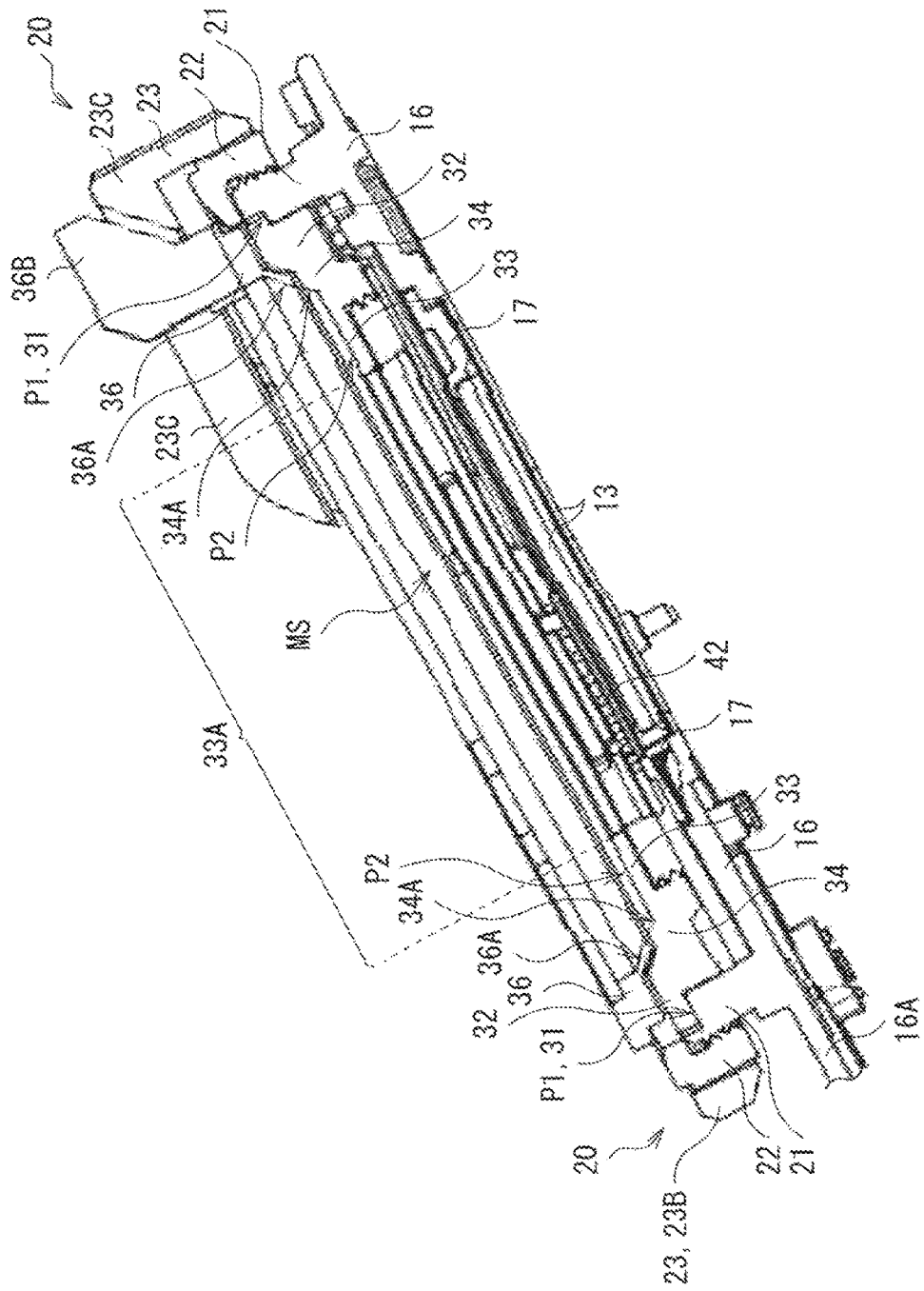
[ FIG. 16 ]

[FIG. 17]
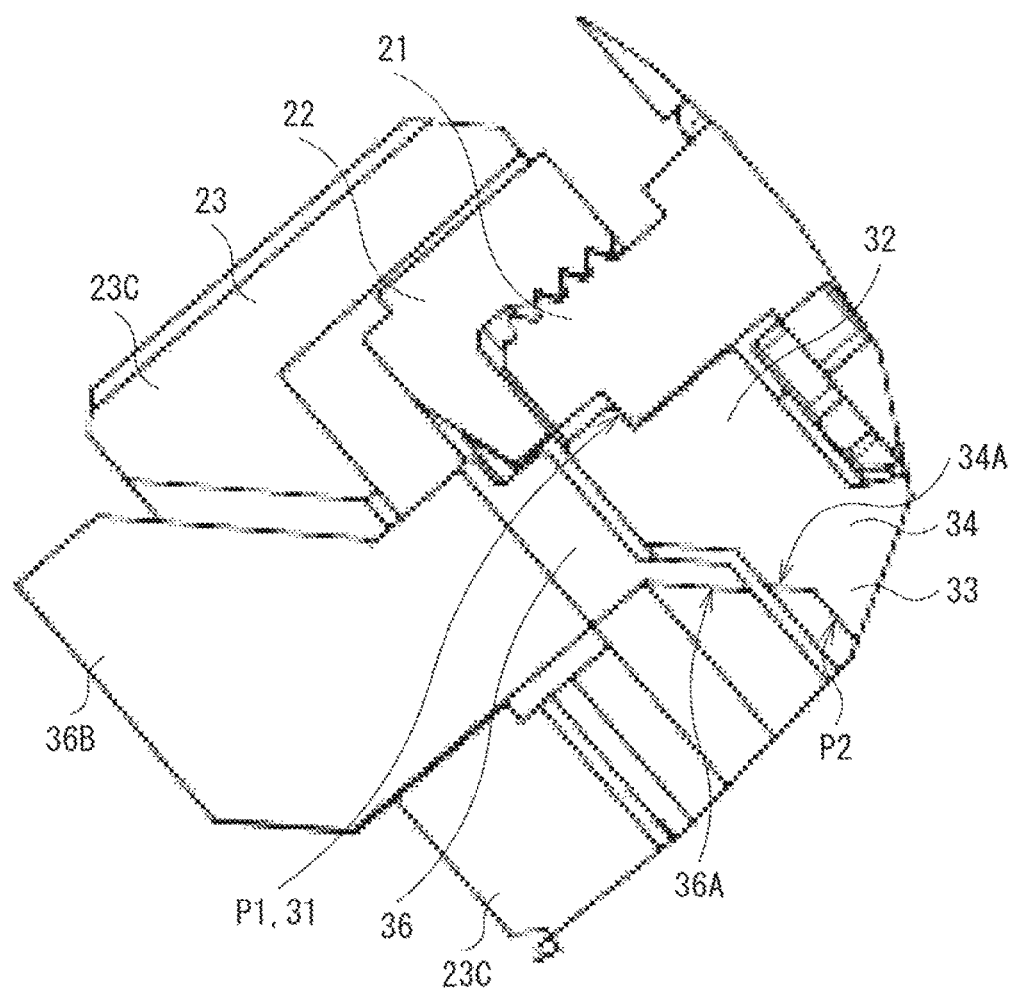

[FIG. 18]
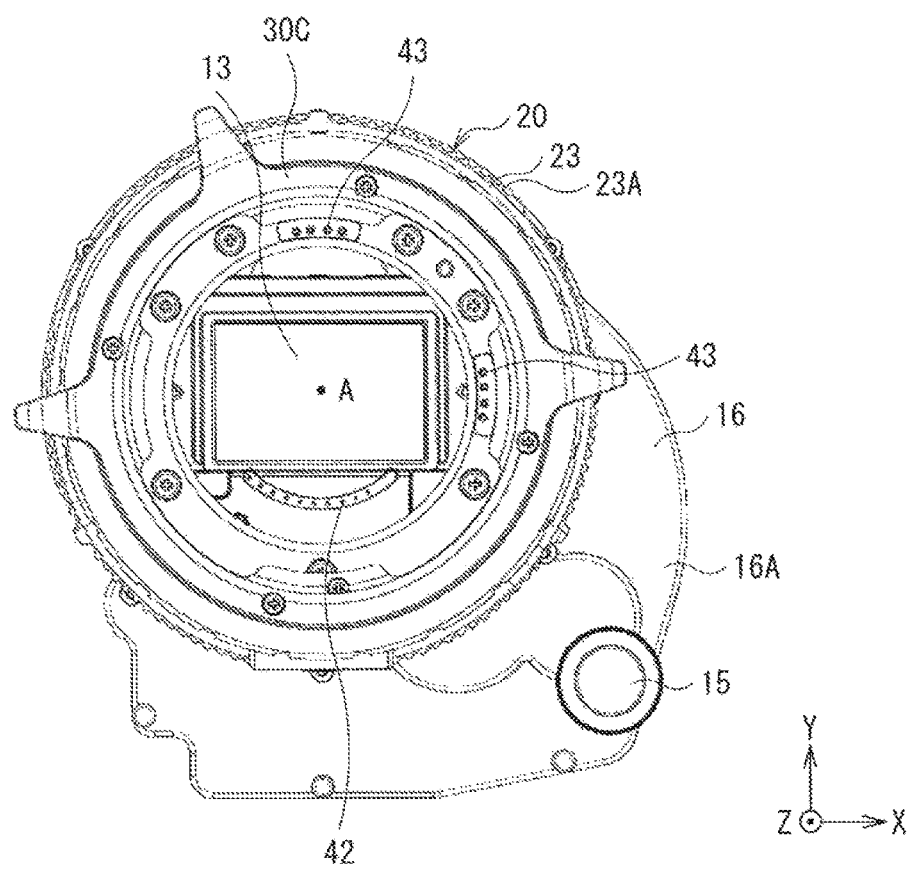

[ FIG. 19 ]
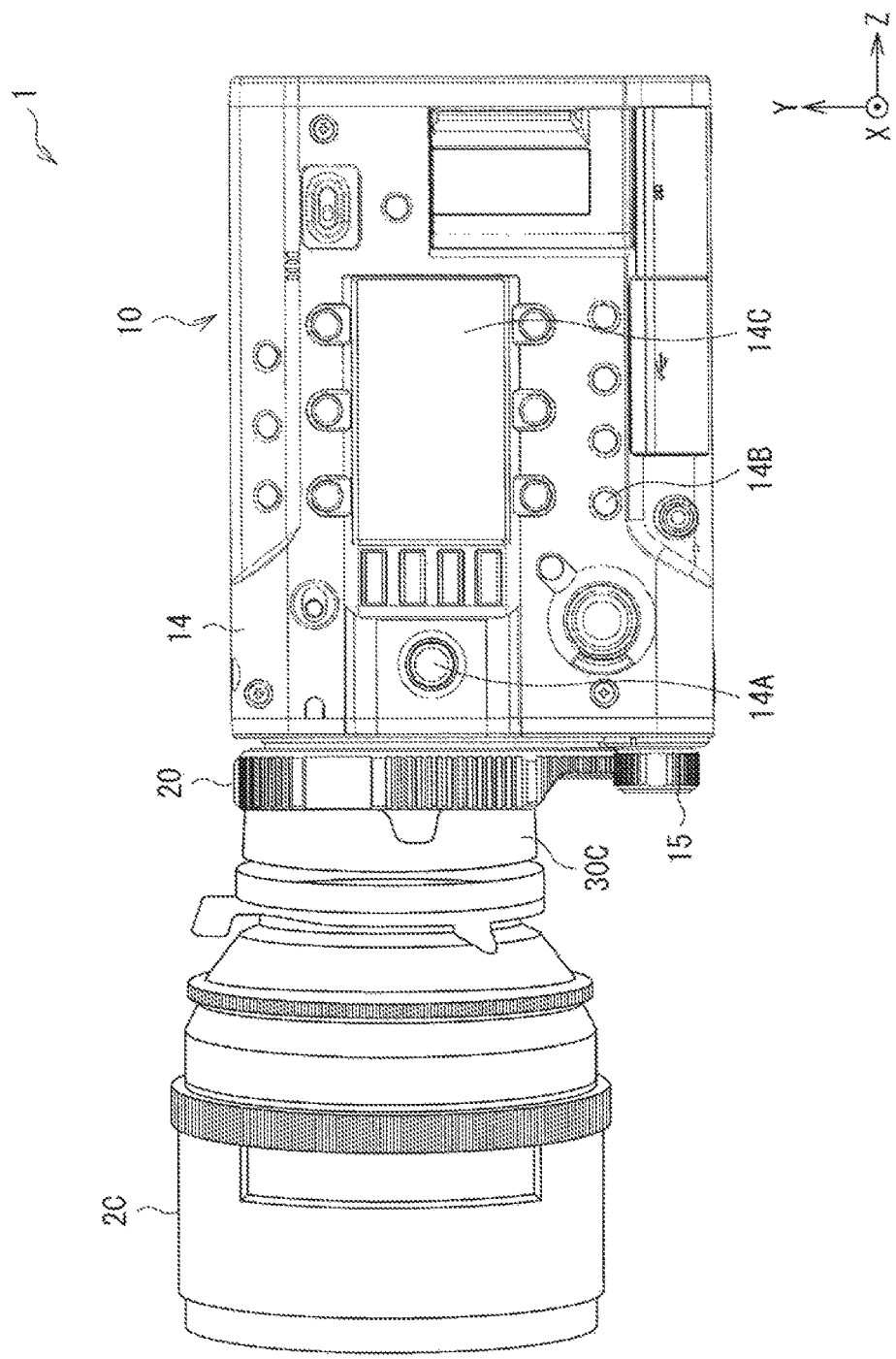

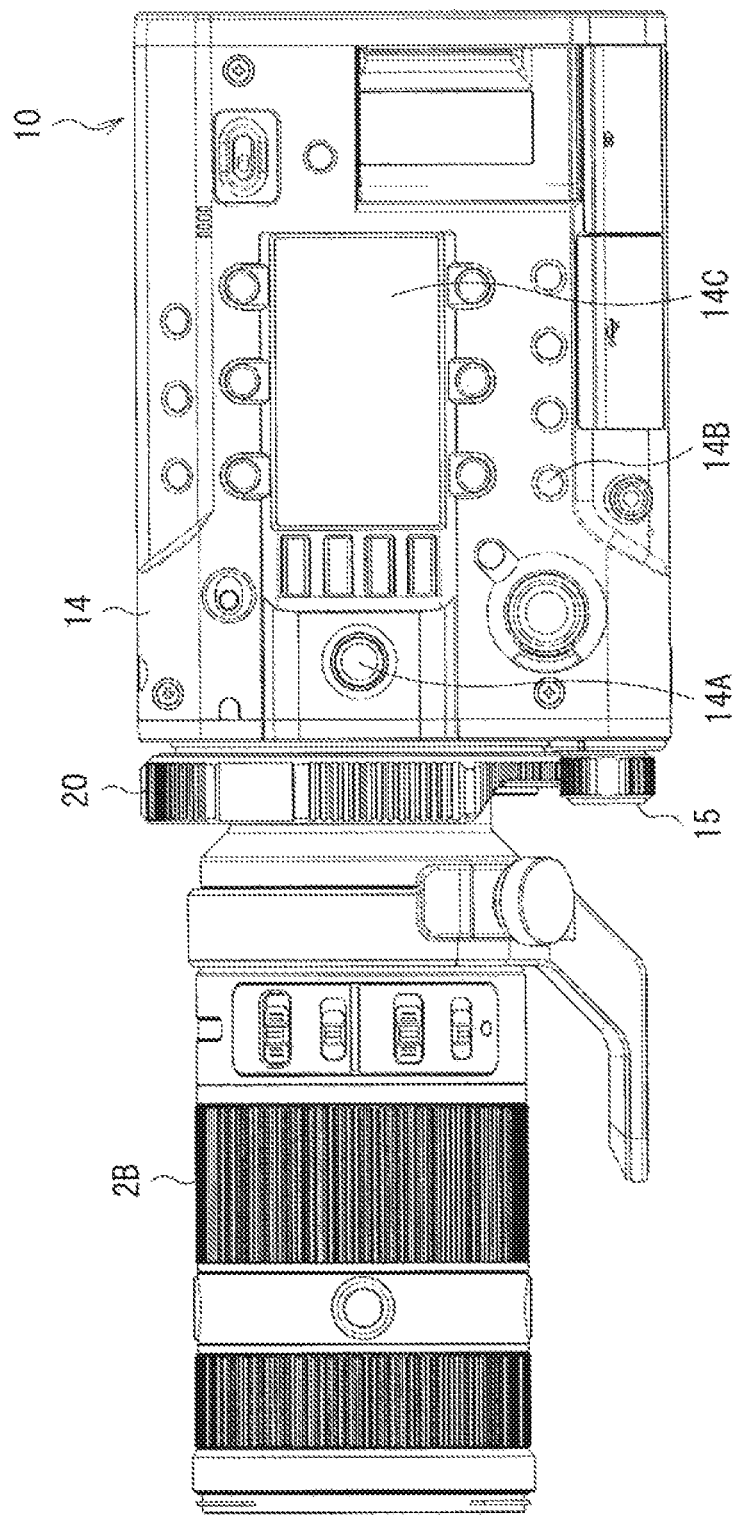
[FIG. 20]

[ FIG. 21 ]
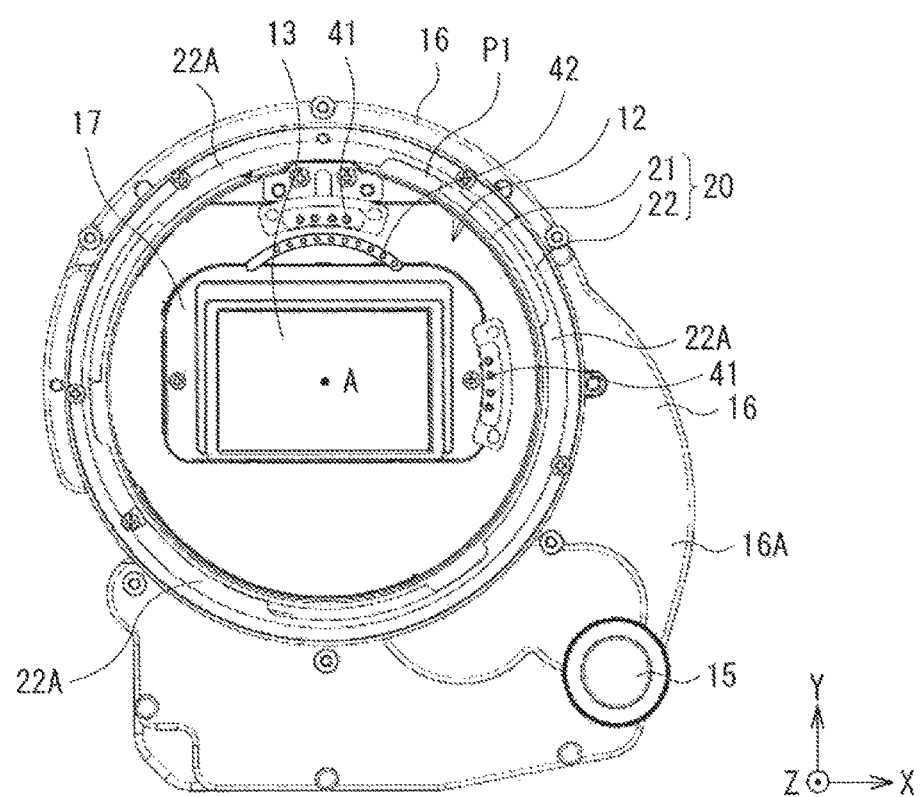

[ FIG. 22 ]
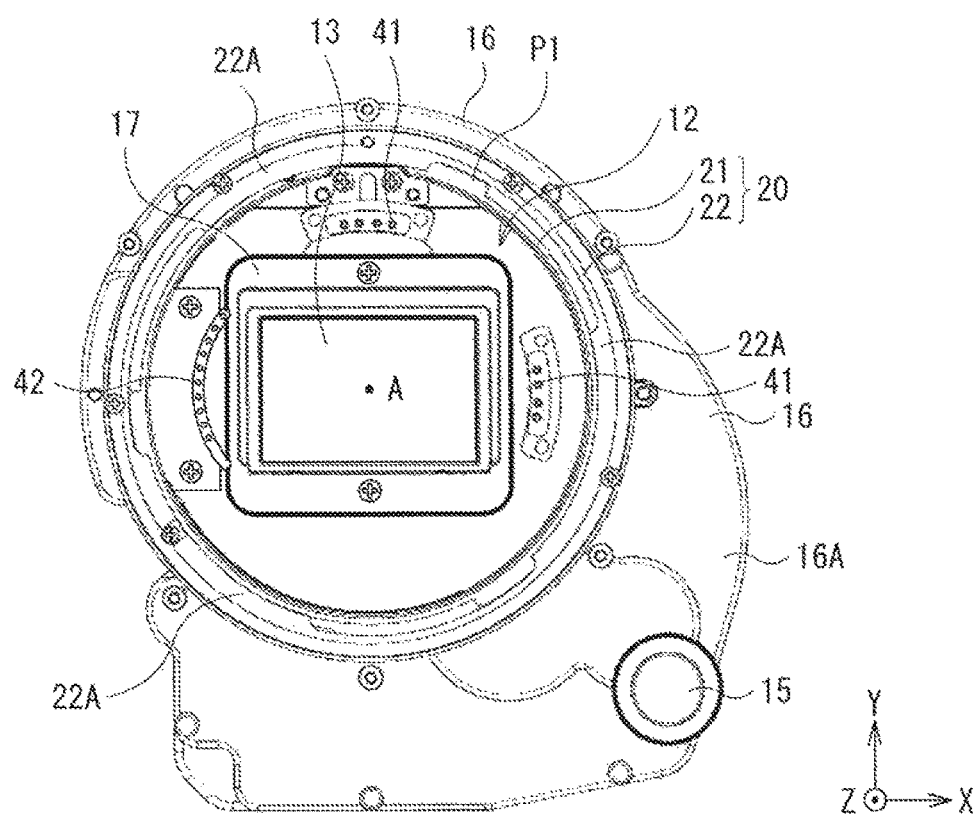

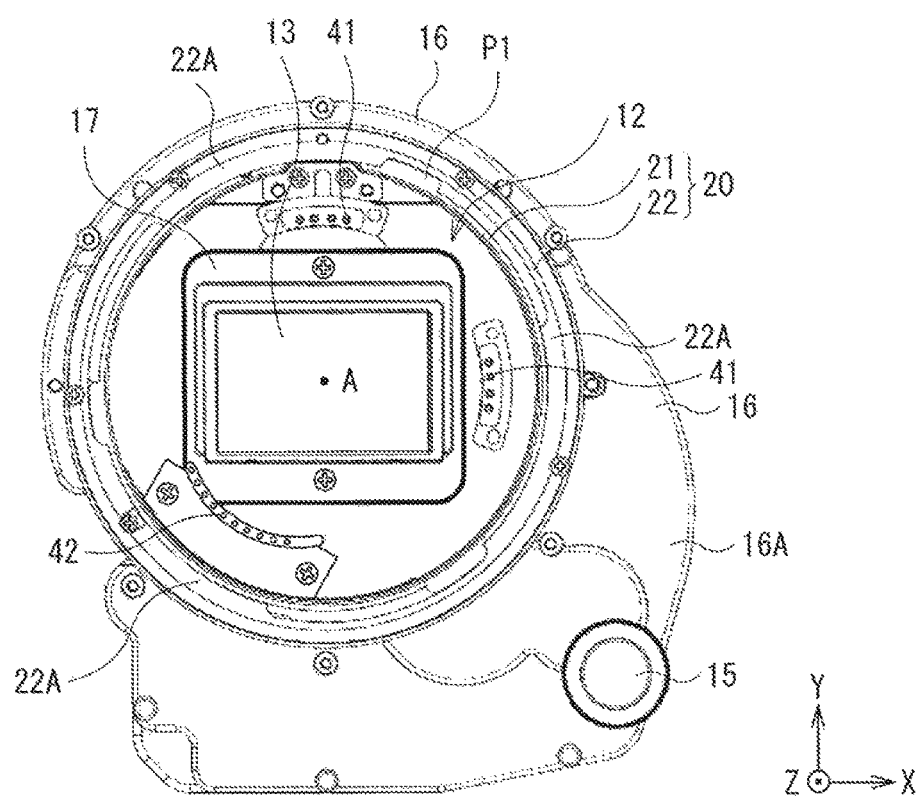
[ FIG. 23 ]

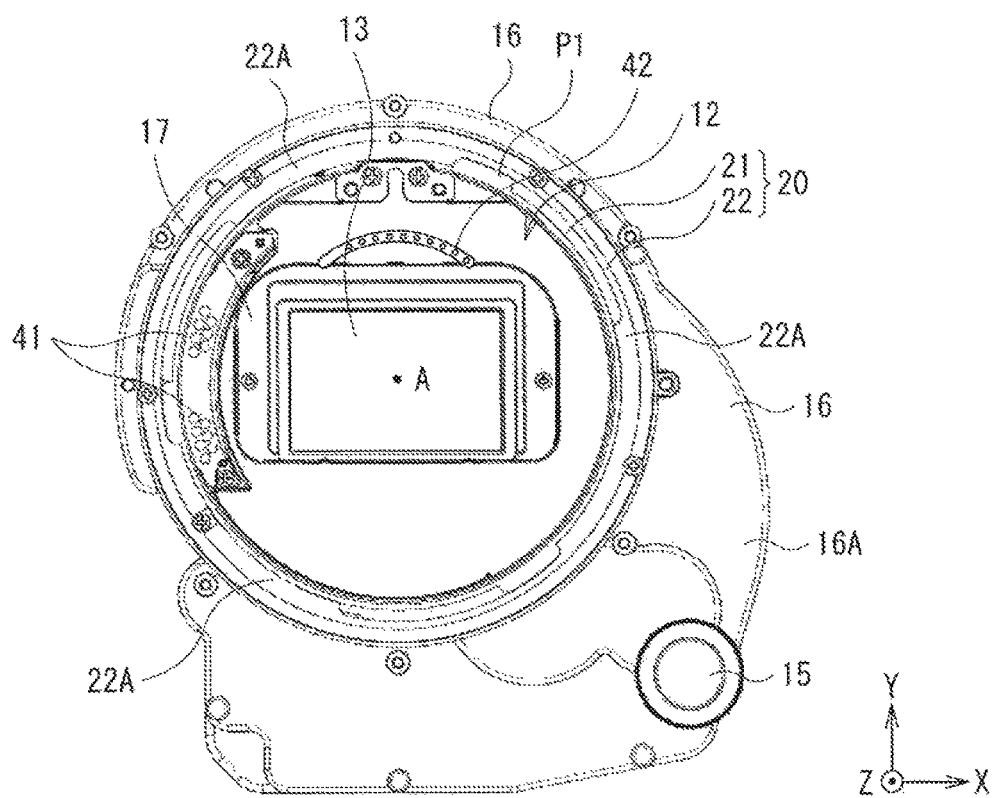
[FIG. 24]

CAMERA AND ADAPTER

CROSS REFERENCE TO RELATED APPLICATIONS

This application is a U.S. National Phase of International Patent Application No. PCT/JP2014/081521 filed on Nov. 28, 2014, which claims priority benefit of Japanese Patent Application No. JP 2014-015452 filed in the Japan Patent Office on Jan. 30, 2014. Each of the above-referenced applications is hereby incorporated herein by reference in its entirety.

TECHNICAL FIELD

The disclosure relates to an interchangeable lens camera and an adapter for use with the camera.

BACKGROUND ART

In an interchangeable lens camera, a lens may be mounted on an aperture of a so-called body-side mount on a front surface of a camera body. One of variables of a body-side mount is a flange back distance. A flange back distance is a distance from a reference plane of a body-side mount to an imaging plane of an imaging device. The reference plane is a plane where a rear end of a lens makes contact with the body-side mount. A body or a body-side mount may have a flange back distance unique to itself. An interchangeable lens may be designed for a flange back distance of a body or a body-side mount on which the interchangeable lens is to be mounted.

So far, in order to use a lens having a longer flange back distance than a flange back distance unique to a body, an intermediate adapter may be attached to the body-side mount for adjustment of the flange back distance (for example, refer to Patent Literature 1).

CITATION LIST

Patent Literature

Patent Literature 1: JP 2007-58123A

SUMMARY OF INVENTION

The use of such an intermediate adapter for the adjustment of the flange back distance, however, is not applicable to a case with use of a lens having a shorter flange back distance than the flange back distance unique to the body. One plausible method to cope with this case may be to replace the whole body-side mount. But the replacement of the whole body-side mount may be difficult and unrealistic.

It is therefore desirable to provide a camera that allows for use of a lens having a shorter flange back distance than a flange back distance unique to a body, and an adapter for use with the camera.

A camera according to an embodiment of the disclosure includes a body-side mount that includes a first reference plane, has a first flange back distance from the first reference plane to an imaging plane, and allows an adapter to be mounted on the first reference plane. The adapter includes a second reference plane, and has a second flange back distance from the second reference plane to the imaging plane. The second flange back distance is shorter than the first flange back distance.

An adapter according to an embodiment of the disclosure is configured to be mounted on a first reference plane of a body-side mount. The body-side mount includes the first reference plane, and has a first flange back distance from the first reference plane to an imaging plane. The adapter includes a second reference plane, and has a second flange back distance from the second reference plane to the imaging plane. The second flange back distance is shorter than the first flange back distance.

In the camera according to the embodiment of the disclosure, or in the adapter according to the embodiment of the disclosure, the adapter is mounted on the first reference plane of the body-side mount. The adapter includes the second reference plane, and has the second flange back distance from the second reference plane to the imaging plane, in which the second flange back distance is shorter than the first flange back distance. This allows for use of a lens having the second flange back distance.

According to the camera according to the embodiment of the disclosure, or according to the adapter according to the embodiment of the disclosure, the body-side mount allows the adapter to be mounted on the first reference plane. The adapter includes the second reference plane, and has the second flange back distance from the second reference plane to the imaging plane, in which the second flange back distance is shorter than the first flange back distance. Hence, it is possible to use a lens having the second flange back distance shorter than the first flange back distance unique to a body, without replacement of the whole body-side mount. It is to be noted that some effects described here are not necessarily limitative, and any of other effects described herein may be achieved.

BRIEF DESCRIPTION OF DRAWINGS

FIG. 1 is a schematic cross-sectional view of a camera according to an example embodiment of the disclosure, provided for description as to mounting of a first lens having a first flange back distance unique to a body, and taking a third lens having a longer flange back distance than the first flange back distance.

FIG. 2 is a schematic cross-sectional view provided for description of a configuration of an adapter according to an example embodiment of the disclosure.

FIG. 3 is a schematic cross-sectional view provided for description of interference of the adapter according to the example embodiment of the disclosure with a front surface part of a body.

FIG. 4 is a side view of an appearance of a body of a camera according to a first embodiment of the disclosure, as seen from right-side-surface side of the body.

FIG. 5 is a front view of an appearance of the body illustrated in FIG. 4, as seen from front.

FIG. 6 is a front view of a configuration of a body-side mount and a front surface part illustrated in FIG. 5, as taken out from a casing and seen from front.

FIG. 7 is a front view of an adapter according to the first embodiment of the disclosure, and a cross-sectional view taken along a line VIIB-VIIB in the front view.

FIG. 8 is a rear view of the adapter illustrated in FIG. 7.

FIG. 9 is a front view of the adapter illustrated in FIG. 7, as mounted on the body-side mount illustrated in FIG. 6.

FIG. 10 is a cross-sectional view taken along the line X-X in FIG. 9.

FIG. 11 is an enlarged cross-sectional view of a part in FIG. 10.

FIG. 12 is a front view of an adapter according to a second embodiment of the disclosure, and a cross-sectional view taken along a line XIIB-XIIB in the front view.

FIG. 13 is a rear view of the adapter illustrated in FIG. 12.

FIG. 14 is a front view of the adapter illustrated in FIG. 12, as mounted on the body-side mount illustrated in FIG. 6, with a mounting and dismounting lever of the adapter at an initial position.

FIG. 15 is a front view of the adapter illustrated in FIG. 12, as mounted on the body-side mount illustrated in FIG. 6, with the mounting and dismounting lever of the adapter at a fastening position.

FIG. 16 is a cross-sectional view taken along a line XVI-XVI in FIG. 15.

FIG. 17 is an enlarged cross-sectional view of a part in FIG. 16.

FIG. 18 is a front view of a first application example of a camera according to an example embodiment of the disclosure, in which an adapter for a cinematographic lens is mounted on the body-side mount according to the first embodiment of the disclosure.

FIG. 19 is a side view of the first application example of the camera according to the example embodiment of the disclosure, in which a cinematographic lens is mounted on the adapter illustrated in FIG. 18.

FIG. 20 is a side view of a second application example of a camera according to an example embodiment of the disclosure, in which a lens having a second flange back distance shorter than a first flange back distance is mounted on the body-side mount according to the first embodiment of the disclosure, with the adapter according to the first embodiment or the second embodiment of the disclosure interposed therebetween.

FIG. 21 is a front view of a configuration of a front surface part of a body according to a modification example 1.

FIG. 22 is a front view of a configuration of a front surface part of a body according to a modification example 2.

FIG. 23 is a front view of a configuration of a front surface part of a body according to a modification example 3.

FIG. 24 is a front view of a configuration of a front surface part of a body according to a modification example 4.

DESCRIPTION OF EMBODIMENTS

In the following, some embodiments of the disclosure are described in detail with reference to the drawings. Note that description is made in the following order.
1. Overall Description
2. First Embodiment (an example with an adapter that adopts a bayonet system)
3. Second Embodiment (an example with an adapter that adopts a breech lock system)
4. First Application Example (an example in which a cinematographic lens is mounted on a body according to an example embodiment of the disclosure, with an adapter for the cinematographic lens interposed therebetween)
5. Second Application Example (an example in which a lens having a second flange back distance shorter than a first flange back distance is mounted on a body according to an example embodiment of the disclosure, with an adapter according to an example embodiment of the disclosure interposed therebetween)
6. Modification Example 1 (an example in which, as seen from front of a body-side mount, a first contact is disposed on upper side and on right side, while a second contact is disposed on the upper side)
7. Modification Example 2 (an example in which, as seen from front of a body-side mount, a first contact is disposed on upper side and on right side, while a second contact is disposed on left side)
8. Modification Example 3 (an example in which, as seen from front of a body-side mount, a first contact is disposed on upper side and on right side, while a second contact is disposed on obliquely lower left side)
9. Modification Example 4 (an example in which, as seen from front of a body-side mount, a first contact is disposed on left side, while a second contact is disposed on upper side)

(Overall Description)

Prior to individualized description on specific embodiments, overall description is given first, with reference to FIGS. 1 to 3, on a camera and an adapter according to an example embodiment of the disclosure.

FIG. 1 schematically illustrates an adjustment method of a flange back distance in the camera according to the example embodiment of the disclosure. Referring to (A) of FIG. 1, a camera 1 may include a body-side mount 20 on a front surface of a body 10. A first lens 2A may be mounted on the body-side mount 20. An imaging device 11 may be incorporated in the body 10. The body-side mount 20 may be provided on a front surface part 12 of the body 10. The front surface part 12 may include an optical component 13 that faces the imaging device 11. It is to be noted that the front surface part 12 may refer to an assembly of components provided in the front surface of the body 10 (i.e., the optical components 13, a first contact 41, a second contact 42, holders thereof, and a chassis 16, which are to be described later), except for the body-side mount 20.

In the following description and figures, Z denotes a direction of an optical axis. An optical axis A may be a line that passes the first lens 2A, the optical component 13, and a center of the imaging device 11. In the direction of the optical axis Z, first lens 2A side (lens side) is referred to as frontward, while body 10 side is referred to as rearward. X denotes a horizontal direction, as seen from front of the body-side mount 20. Y denotes a vertical direction, as seen from front of the body-side mount 20.

The body 10 may have a first flange back distance FB1. The first flange back distance FB1 may be a distance from a first reference plane P1 of the body-side mount 20 to an imaging plane P11 in the direction of the optical axis Z, and may be a value unique to each model of the body 10. The first reference plane P1 may be a plane where the body-side mount 20 makes contact with a rear end of the first lens 2A. The imaging plane P11 may correspond to, for example, a plane where light enters a photodiode of the imaging device 11. Basically, the body 10 may take the first lens 2A that is adapted for the first flange back distance FB1 unique to the body 10.

(B) of FIG. 1 illustrates a case of coping with a third lens 2C having a third flange back distance FB3 longer than the first flange back distance FB1. In this case, an adapter 30C may be mounted on the body-side mount 20 to add, to the first flange back distance FB1, a maximum thickness D30C of the adapter 30C in the direction of the optical axis Z. The maximum thickness D30C of the adapter 30C may be a distance from a mounting plane 31C to a third reference plane P3 in the direction of the optical axis Z. The mounting plane 31C may be a plane that makes contact with the first reference plane P1 when the adapter 30C is mounted on the first reference plane P1 of the body-side mount 20. The third reference plane P3 may be a plane on which the third lens 2C is mounted. Use of the adapter 30C allows for coupling, to the body 10, of the third lens 2C having the third flange back distance FB3 longer than the first flange back distance FB1.

In the adapter 30C, however, the third reference plane P3 is positioned, in the direction of the optical axis Z, forward of the mounting plane 31C, i.e., on third lens 2C side. It follows, therefore, that the use of the adapter 30C causes a distance from the third reference plane P3 to the imaging plane P11 to be longer than the first flange back distance FB1. Hence, it is difficult for the adapter 30C to take a second lens having a second flange back distance shorter than the first flange back distance FB1.

FIG. 2 schematically illustrates a cross-sectional configuration of an adapter 30 according to an example embodiment of the disclosure. Referring to (A) of FIG. 2, the adapter 30 is configured to be mounted on the first reference plane P1 of the body-side mount 20 as described. The body-side mount 20 includes the first reference plane P1, and has the first flange back distance FB1 from the first reference plane P1 to the imaging plane P11. Also, the adapter 30 includes a second reference plane P2, and has a second flange back distance FB2 from the second reference plane P2 to the imaging plane P11. The second flange back distance FB2 is shorter than the first flange back distance FB1. The second reference plane P2 may be a plane on which a second lens 2B (refer to (A) of FIG. 2) having the second flange back distance FB2 is mounted. Thus, in the camera 1, it is possible to take the second lens 2B having the second flange back distance FB2 shorter than the first flange back distance FB1 unique to the body 10, without replacement of the whole body-side mount 20.

In one specific example, as illustrated in (B) of FIG. 2, the adapter 30 may include a mounting plane 31 that makes contact with the first reference plane P1 when mounted on the first reference plane P1 of the body-side mount 20. In one preferred example, the second reference plane P2 may be positioned, in the direction of the optical axis Z, closer to the imaging plane P11 than the mounting plane 31 is. This makes it possible to allow the second lens 2B having the second flange back distance FB2 shorter than the first flange back distance FB1 unique to the body 10 to be mounted on the body-side mount 20 with the adapter 30 in between.

The adapter 30 may include an outer circumferential part 32 and an inner circumferential part 33, as illustrated in (B) of FIG. 2. The adapter 30 may have an aperture 33A on inner circumferential side. The outer circumferential part 32 may be a part that is configured to be mounted on the first reference plane P1 of the body-side mount 20, and may include the mounting plane 31 as described. The inner circumferential part 33 may be provided inside the outer circumferential part 32, concentrically with the outer circumferential part 32. The inner circumferential part 33 may include the second reference plane P2. The outer circumferential part 32 and the inner circumferential part 33 may be coupled together by an intermediate part 34 in the direction of the optical axis Z.

As illustrated in (A) of FIG. 2, when the outer circumferential part 32 is mounted on the first reference plane P1 of the body-side mount 20, the inner circumferential part 33 may intrude itself into a mounting space MS surrounded by the body-side mount 20 and the front surface part 12 of the body 10. However, the front surface part 12 of the body 10 is designed for mounting of the first lens 2A having the first flange back distance FB1. Intrusion of the adapter 30 deeply into the mounting space MS is, therefore, normally unexpected by a designer of the front surface part 12. Thus, as illustrated in FIG. 3, there may be possibility of interference IF of the adapter 30 with the front surface part 12 of the body 10.

Accordingly, in the example embodiment of the disclosure, in one preferred example, as illustrated in (B) of FIG. 2, the front surface part 12 of the body 10 may be configured to avoid interference with the adapter 30 that is to be mounted on the first reference plane P1. In one preferred and specific example, the optical component 13 disposed in the front surface part 12 may allow for a shortened distance D13 from the optical component 13 to the imaging plane P11 in the direction of the optical axis Z, so as to avoid interference of the optical component 13 with the adapter 30. Also, in one preferred example, the front surface part 12 may be retreated rearward in the direction of the optical axis Z on assumption of mounting of the adapter 30. In one preferred example, an amount of retreat R12 at this occasion may be adapted to avoid interference with the adapter 30, based on a difference between the first flange back distance FB1 unique to the body 10 and the second flange back distance FB2 of the adapter 30 and the second lens 2B that are to be mounted. This makes it possible to provide a greater margin with the mounting space MS, and to avoid more surely interference with the adapter 30. Description on details of such design of the front surface part 12 to avoid interference is given later in a first embodiment. It is to be noted that components disposed in the front surface part 12 other than the optical component 13 may be positioned, in the direction of the optical axis Z, level with or substantially level with the optical component 13. Alternatively, as illustrated in FIG. 2, the components disposed in the front surface part 12 other than the optical component 13 may be retreated, in the direction of the optical axis Z, more rearward than the optical component 13.

In the following, description is given on some embodiments (the first embodiment and a second embodiment) that embody the camera 1 and the adapter 30 as described.

(First Embodiment)

FIG. 4 illustrates an appearance of a body 10 of a camera 1 according to the first embodiment of the disclosure, as seen from right-side-surface side of the body 10. FIG. 5 illustrates an appearance of the body 10 illustrated in FIG. 4, as seen from front. The camera 1 may be, for example, a cinematographic camera, and may include a body-side mount 20 in a foremost part of the body 10 in the direction of the optical axis Z. The body 10 may include a casing 14. The imaging device 11 (not illustrated in FIG. 4, refer to FIG. 2) may be incorporated in the casing 14. A recording start button 14A, a menu selection button 14B, a side panel 14C, operation buttons and adjustment buttons of various kinds, accessory mounting parts for a view finder and other accessories, an external memory accommodation part, a USB coupling part, a battery coupling part, and other functional parts may be appropriately arranged on respective surfaces of the casing 14.

The body-side mount 20 may serve as a coupling part between the first lens 2A (refer to (A) of FIG. 1), the adapter 30C (refer to (B) of FIG. 1), or the adapter 30 (refer to (A) of FIG. 2) and the body 10. As illustrated in FIG. 5, the body-side mount 20 may be provided in an upper center part of a front surface of the casing 14 of the body 10. The optical component 13 may be provided in a center part inside the body-side mount 20. The imaging device 11 (not illustrated in FIG. 5, refer to (A) of FIG. 2) may be disposed behind the optical component 13 in the direction of the optical axis Z. A first contact 41 and a second contact 42 may be provided in a region inside the body-side mount 20 and around the optical component 13. Moreover, an operation dial 15 may be provided on obliquely lower right side in the front surface of the casing 14 of the body 10. The operation dial 15 may be an operation part that allows a user to switch optical components such as ND filters (dimmer filters) interposed between the optical component 13 and the imaging device 11. It is to be noted that the operation dial 15 is not limited to a rotation type (a dial type) as in the embodiment. For example, the operation dial 15 may be of a push type such as an operation button.

FIG. 6 illustrates a configuration of the body-side mount 20 and the front surface part 12 illustrated in FIG. 5, as taken out from the casing 14 and seen from front. The front surface part 12 may include a chassis 16. The body-side mount 20 may occupy a region from a left part to an upper part of the chassis 16. The chassis 16 may include an accommodation part 16A on lower side and on obliquely lower right side of the body-side mount 20. The accommodation part 16A may accommodate a turret (not illustrated) that supports the optical components such as the ND filters as described. The number of the optical components such as the ND filters may be, for example, three or four. The operation dial 15 as described may be provided on obliquely lower right side of the accommodation part 16A, allowing a user to turn the operation dial 15 to cause the turret to turn to switch the optical components such as the ND filters.

The body-side mount 20 may adopt a breech lock system as a mount system of the first lens 2A, the adapter 30C, or the adapter 30, and may include a mounting ring 21, a support ring 22, and a fastening ring 23 in the order named from inner circumferential side. It is to be noted that FIG. 6 depicts solely the mounting ring 21 and the support ring 22, and that the fastening ring 23 is depicted not in FIG. 6 but in FIG. 5. The adoption of the breech lock system in the body-side mount 20 makes it possible to allow the first lens 2A or a large-sized and heavy-weighed cinematographic lens to be robustly fastened to the body 10, leading to higher reliability. There is also another advantage that the first lens 2A or other lenses may be mounted and dismounted without turning them.

The mounting ring 21 may be a part on which a rear end of the first lens 2A, the adapter 30C, or the adapter 30 is seated. The mounting ring 21 may include the first reference plane P1 as described. The first reference plane P1 may be a plane on which the rear end of the first lens 2A, the adapter 30C, or the adapter 30 is mounted. A distance from the first reference plane P1 to the imaging plane P11 in the direction of the optical axis Z may constitute the first flange back distance FB1 (refer to (A) of FIG. 1) unique to the body 10. The body 10 may basically take the first lens 2A (refer to (A) of FIG. 1) adapted for the first flange back distance FB1.

The support ring 22 may be a part that supports the rear end of the first lens 2A, the adapter 30C, or the adapter 30. The support ring 22 may include tabs 22A at circumferentially-spaced three positions. The tabs 22A may extend over the first reference plane P1 of the mounting ring 21, allowing the rear end of the first lens 2A or the adapter 30 to be interposed and supported between the first reference plane P1 and the tabs 22A.

The fastening ring 23 may turn around the optical axis A together with the support ring 22, to fasten and fix the first lens 2A, the adapter 30C, or the adapter 30 to the body-side mount 20. In one preferred example, uneven slip prevention 23A may be provided in an outer side surface of the fastening ring 23, making it easier for a user to grip and turn the fastening ring 23.

The optical component 13 may be, for example, a glass plate member that may serve as protection of the imaging device 11 and have appropriate optical functions. The optical component 13 may be shaped as, for example, a rectangle elongated in one direction, and may be laterally-long disposed in a center part of a circular region surrounded by the body-side mount 20. Incidentally, it is to be appreciated that the imaging device 11 may be also laterally-long disposed, similarly to the optical component 13. The optical component 13 may be supported by an optical component holder 17. The optical component holder 17 may be fixed to the chassis 16 with screws 17A and 17B.

The first contact 41 may couple the first lens 2A to the body 10. The first lens 2A may be mounted on the first reference plane P1, and may have the first flange back distance FB1 unique to the body 10. The first contact 41 may refer to a group of contacts that at least include, for example, a contact that supplies electric power from the body 10 to the first lens 2A attached to the body 10, and a contact that supplies a drive signal from the body 10 to the first lens 2A. The drive signal may be a signal that drives the first lens 2A.

The first contact 41 may be disposed on left side in a circumferential direction of the body-side mount 20 (a circumferential direction around the optical axis A), as seen from front of the body-side mount 20. In other words, the first contact 41 may be disposed in a circular-arc-shaped arrangement along a left short side of the optical component 13. The first contact 41 may be supported by a first contact holder 41A. The first contact holder 41A may be fixed to and supported by the chassis 16 with screws 41B and 41C.

The second contact 42 may couple the second lens 2B to the body 10. The second lens 2B may be mounted on the second reference plane P2, and may have the second flange back distance FB2. The second contact 42 may refer to a group of contacts that at least include, for example, a contact that supplies electric power from the body 10 to the second lens 2B attached to the body 10, and a contact that supplies a drive signal from the body 10 to the second lens 2B. The drive signal may be a signal that drives the second lens 2B.

The second contact 42 may be disposed on lower side in the circumferential direction of the body-side mount 20, as seen from front of the body-side mount 20. In other words, the second contact 42 may be disposed in a circular-arc-shaped arrangement along a lower long side of the optical component 13. The second contact 42 may be supported by a second contact holder 42A. The second contact holder 42A may be fixed to and supported by the chassis 16 with screws 42B and 42C.

In one preferred example, the second contact 42 may be positioned, in a radial direction of the body-side mount 20 (a radial direction with respect to the optical axis A), more inwardly than the first contact 41 is. This makes it possible, as described later, to allow the second contact 42 to be exposed in the aperture 33A on the inner circumferential side of the adapter 30 when the adapter 30 is mounted on the first reference plane P1. This allows for easy coupling of the second contact 42 to the second lens 2B. Meanwhile, the first contact 41 may be hidden behind the adapter 30. This allows a user to easily and visually recognize a situation not to allow for mounting of the first lens 2A. Hence, it is possible to avoid mistakes in lens mounting.

Moreover, in one preferred example, the first contact 41 and the second contact 42 may be positioned at different positions in the circumferential direction of the body-side mount 20. This allows for simplification of configurations of the first contact holder 41A and the second contact holder 42A. It is to be noted that, in an alternative, the first contact 41 and the second contact 42 may be positioned at same positions or at substantially same positions in the circumferential direction of the body-side mount 20. Modification examples of an arrangement of the first contact 41 and the second contact 42 are described later.

(A) of FIG. 7 illustrates a configuration of the adapter 30 according to the first embodiment of the disclosure, as seen from front. (B) of FIG. 7 illustrates a configuration in cross-section taken along a line VIIB-VIIB in (A) of FIG. 7.

As illustrated in (A) of FIG. 2, the adapter 30 is configured to be mounted on the first reference plane P1 of the body-side mount 20. The body-side mount 20 includes the first reference plane P1 as described, and has the first flange back distance FB1 from the first reference plane P1 to the imaging plane P11. Also, the adapter 30 includes the second reference plane P2, and has the second flange back distance FB2 from the second reference plane P2 to the imaging plane P11. The second flange back distance FB2 is shorter than the first flange back distance FB1. The second reference plane P2 may be a plane on which the second lens 2B (refer to (A) of FIG. 2) having the second flange back distance FB2 is mounted. Thus, in the camera 1, it is possible to take the second lens 2B having the second flange back distance FB2 shorter than the first flange back distance FB1 unique to the body 10, without replacement of the whole body-side mount 20.

In one specific example, the adapter 30 may allow the second lens 2B having the second flange back distance FB2 to be fixed to the body-side mount 20. The adapter 30 may include, for example, as illustrated in (A) and (B) of FIG. 7, the outer circumferential part 32, the inner circumferential part 33, and the intermediate part 34. The adapter 30 may have the circular-shaped aperture 33A on the inner circumferential side. An aperture diameter of the adapter 30 may be smaller than an aperture diameter of the body-side mount 20.

The outer circumferential part 32 may be a part that is configured to be mounted on the first reference plane P1 of the body-side mount 20, and may include the mounting plane 31. The mounting plane 31 may be a plane that makes contact with the first reference plane P1 when the adapter 30 is mounted on the first reference plane P1 of the body-side mount 20. The outer circumferential part 32 may include outer tabs 32A at circumferentially-spaced three positions. The outer tabs 32A are provided for mounting on the body-side mount 20.

The inner circumferential part 33 may be provided inside the outer circumferential part 32, concentrically with the outer circumferential part 32. The inner circumferential part 33 may include the second reference plane P2. In one preferred example, the second reference plane P2 may be positioned, in the direction of the optical axis Z, closer to the imaging plane P11 than the mounting plane 31 is. This makes it possible to allow the second lens 2B having the second flange back distance FB2 shorter than the first flange back distance FB1 unique to the body 10 to be mounted on the body-side mount 20 with the adapter 30 in between.

The intermediate part 34 may be a shouldered part that couples the outer circumferential part 32 and the inner circumferential part 33 together in the direction of the optical axis Z. In one preferred example, the intermediate part 34 may include an inclined plane 34A that links the outer circumferential part 32 and the inner circumferential part 33 together. The inclined plane 34A makes it possible to take lenses of various shapes. In addition, the inclined plane 34A may produce margin space around a second lens dismounting button 35C to be described later. This makes it easier for a user to press the second lens dismounting button 35C.

FIG. 8 illustrates a configuration of the adapter 30 illustrated in FIG. 7, as seen from rear surface side. The adapter 30 may adopt a bayonet system as a mount system of the second lens 2B, and may include, for example, inner tabs 35A, a bayonet mechanism 35B, and the second lens dismounting button 35C.

The inner tabs 35A may be provided for mounting of the second lens 2B on the second reference plane P2. The inner tabs 35A may be provided, for example, as illustrated in (A) of FIG. 7, at circumferentially-spaced three positions of the aperture 33A of the inner circumferential part 33.

The bayonet mechanism 35B may be a spring mechanism provided on rear side of the inner tabs 35A, as illustrated in FIG. 8. The bayonet mechanism 35B may press the second lens 2B to the second reference plane P2, to restrain displacement or positional deviation of the second lens 2B in the direction of the optical axis Z.

The second lens dismounting button 35C may be a push button that allows the second lens 2B to be dismounted from the adapter 30, as illustrated in (A) of FIG. 7. The second lens dismounting button 35C may be provided on obliquely lower left side of the outer circumferential part 32 and the intermediate part 34.

Moreover, in one preferred example, the second lens dismounting button 35C may be more protruded, in the direction of the optical axis Z, toward the second lens 2B than a front surface 32A of the outer circumferential part 32, as illustrated in (B) of FIG. 7. This makes it possible for a user to easily press the second lens dismounting button 35C not with a tiptoe but with a finger cushion. This leads to enhancement in usability.

FIG. 9 illustrates a configuration of the adapter 30, as mounted on the body-side mount 20 as illustrated in FIG. 6 and seen from front of the body-side mount 20. It is to be noted that FIG. 9 depicts the fastening ring 23 that is omitted in FIG. 6.

In one preferred example, when the adapter 30 is mounted on the first reference plane P1, the first contact 41 may be hidden behind the adapter 30, while the second contact 42 may be exposed in the aperture 33A on the inner circumferential side of the adapter 30. This makes it possible, as described later, to allow the second contact 42 to be exposed in the aperture 33A opened on the inner circumferential side of the adapter 30 when the adapter 30 is mounted on the first reference plane P1. Hence, it is possible to easily couple the second contact 42 to the second lens 2B. Meanwhile, the first contact 41 may be hidden behind the adapter 30, allowing a user to easily and visually recognize the situation not to allow for the mounting of the first lens 2A. Hence, it is possible to avoid mistakes in lens mounting.

Moreover, in one preferred example, the fastening ring 23 may include a notch 23B provided along a part of the fastening ring 23 in a circumferential direction of the fastening ring 23. For example, the notch 23B may be provided along a lower part in the circumferential direction of the fastening ring 23, as seen from front of the body-side mount 20. The notch 23B may be a part in the circumferential direction of the fastening ring 23, in which a height of the fastening ring 23 in the direction of the optical axis Z is reduced. This makes it possible to produce space along the lower part of the fastening ring 23, and to avoid interference of a component protruding downward from a lens barrel of the first lens 2A or the second lens 2B with the fastening ring 23. In one preferred example, the notch 23B may have the height in the direction of the optical axis Z that allows the notch 23B to form a same plane or a substantially same plane as the support ring 22.

The fastening ring 23 may include a rising wall 23C provided along a part other than the notch 23B. In one preferred example, the rising wall 23C may have a central angle α around the optical axis A being equal to or larger than 180°. This makes it possible for a user to easily grip and turn the rising wall 23C. It is to be noted that the uneven slip prevention 23A may be provided solely in the rising wall 23C, or may be provided in both the rising wall 23C and the notch 23B.

In one preferred example, the second lens dismounting button 35C of the adapter 30 may be provided within a range of the notch 23B of the fastening ring 23. This makes it possible for a user to easily press the second lens dismounting button 35C, leading to enhanced convenience.

Moreover, in one preferred example, the second lens dismounting button 35C of the adapter 30 may be provided on obliquely lower side in the circumferential direction of the body-side mount 20, as seen from front of the body-side mount 20. For example, the second lens dismounting button 35C may be provided on obliquely lower left side or on obliquely lower right side. When the second lens dismounting button 35C is provided on lower side in the circumferential direction of the body-side mount 20, there may be possibility that the second lens dismounting button 35C may interfere with a component attached to a lower part of the second lens 2B, causing difficulties in operating the second lens dismounting button 35C. Moreover, in many cases, the second lens dismounting button 35C may be operated by an assistant photographer who stands beside the camera 1 in assisting a chief photographer. The second lens dismounting button 35C may be, therefore, disposed on the obliquely lower left side or on the obliquely lower right side, making it easier for the assistant photographer to operate the second lens dismounting button 35C. This leads to enhancement in work efficiency. It is to be noted that FIG. 9 represents an example in which the operation dial 15 is disposed on the obliquely lower right side while the second lens dismounting button 35C is disposed on the obliquely lower left side. However, both the operation dial 15 and the second lens dismounting button 35C may be disposed on the obliquely lower left side. Alternatively, both the operation dial 15 and the second lens dismounting button 35C may be disposed on the obliquely lower right side.

FIG. 10 illustrates a configuration of the front surface part 12, the body-side mount 20, and the adapter 30 illustrated in FIG. 9, in cross-section taken in a radial direction and including the second lens dismounting button 35C. The body-side mount 20 may include, as described, the mounting ring 21, the support ring 22, and the fastening ring 23 in the order named from the inner circumferential side. The mounting plane 31 of the outer circumferential part 32 of the adapter 30 may be in contact with the first reference plane P1 of the mounting ring 21 of the body-side mount 20. The outer circumferential part 32 of the adapter 30 may be interposed and supported between the first reference plane P1 of the mounting ring 21 and the tabs 22A of the support ring 22. The inner circumferential part 33 of the adapter 30 may intrude itself into the mounting space MS surrounded by the body-side mount 20 and the front surface part 12 of the body 10.

In the front surface part 12, the optical component 13 may be disposed facing the aperture of the inner circumferential part 33 of the adapter 30. The optical component 13 may be supported by the optical component holder 17. The optical component holder 17 may be fixed to the chassis 16 with the screws 17A and 17B (not illustrated in FIG. 10, refer to FIG. 6).

Here, in the optical component 13, the distance D13 (refer to (A) of FIG. 2) from the optical component 13 to the imaging plane P11 in the direction of the optical axis Z may be shortened, in order to avoid interference of the optical component 13 with the adapter 30. This corresponds to one preferred example of the design for shortening as described.

Moreover, the optical component holder 17 and the chassis 16 may be retreated toward the imaging plane P11 in the direction of the optical axis Z. This corresponds to another preferred example of the design to avoid interference as described. The amount of retreat R12 (refer to (B) of FIG. 3) at this occasion may be adapted to avoid the interference with the adapter 30 in accordance with the difference between the first flange back distance FB1 unique to the body 10 and the second flange back distance FB2 of the adapter 30 and the second lens 2B that are to be mounted. This makes it possible to ensure margin space on the body 10 side, and to avoid interference of the adapter 30 that intrudes itself into the mounting space MS with the front surface part 12 of the body 10. In one specific example, as illustrated in FIG. 6, space S17 may be produced in vicinity of the optical component holder 17, while space S16 may be produced in vicinity of the chassis 16. Moreover, although not illustrated in FIG. 10, the second contact holder 42A may be retreated toward the imaging plane P11 in the direction of the optical axis Z. This corresponds to one similar example of the design to avoid interference. In this way, as illustrated in FIG. 6, space S42 may be produced in vicinity of the second contact holder 42A.

FIG. 11 illustrates, in an enlarged manner, a cross-sectional configuration in vicinity of the second lens dismounting button 35C illustrated in FIG. 10. When the adapter 30 is mounted on the first reference plane P1 of the body-side mount 20, a part of the first contact holder 41A where the screw 41C is provided may be positioned behind the second lens dismounting button 35C in the direction of the optical axis Z. In one preferred example, therefore, the first contact holder 41A may have a clearance C41 at a position facing the second lens dismounting button 35C when the adapter 30 is mounted on the first reference plane P1. In the clearance C41, a part of the first contact holder 41A that may interfere with the second lens dismounting button 35C (i.e., a part in vicinity of the screw 41C) may be retreated toward the imaging plane P11 in the direction of the optical axis Z. By providing the clearance C41, it is possible for the first contact holder 41A to avoid interference with the second lens dismounting button 35C, while keeping the first contact 41 positioned to be coupled to the first lens 2A in the direction of the optical axis Z.

In the camera 1, the adapter 30 and the second lens 2B may be attached to the body 10, for example, as follows.

First, the outer tabs 32A of the outer circumferential part 32 of the adapter 30 may be fitted into between the tabs 22A of the support ring 22 of the body-side mount 20. Next, the fastening ring 23 may be turned around in a fastening direction. This causes the outer tabs 32A of the adapter 30 to be interposed between the tabs 22A of the body-side mount 20 and the first reference plane P1. Thus, the adapter 30 may be mounted on and fixed to the first reference plane P1 of the body-side mount 20.

At this occasion, as illustrated in (A) of FIG. 2, the inner circumferential part 33 may intrude itself into the mounting space MS surrounded by the body-side mount 20 and the front surface of the body 10, with the outer circumferential part 32 mounted on the first reference plane P1 of the body-side mount 20. However, the front surface part 12 of the body 10 may be retreated rearward in the direction of the optical axis Z, in accordance with the design to avoid interference as described. Specifically, the optical component holder 13, the second contact holder 42A, and the chassis 16 may be retreated rearward in the direction of the optical axis Z. Accordingly, the front surface part 12, i.e., the optical component holder 17, the second contact holder 42A, and the chassis 16 may be prevented from interfering with the adapter 30 mounted on the first reference plane P1. Moreover, the first contact holder 41A may have the clearance C41. Accordingly, the first contact holder 41A may be prevented from interfering with the second lens dismounting button 35C.

Thereafter, tabs (not illustrated) at the rear end of the second lens 2B may be fitted into between the inner tabs 35A of the inner circumferential part 33 of the adapter 30. Then, the second lens 2B may be turned. This allows the second lens 2B to be mounted on and fixed to the second reference plane P2 of the adapter 30.

As described, in the embodiment, the adapter 30 is configured to be mounted on the first reference plane P1 of the body-side mount 20. The adapter 30 includes the second reference plane P2, and has the second flange back distance FB2 from the second reference plane P2 to the imaging plane P11. The second flange back distance FB2 is shorter than the first flange back distance FB1. Hence, it is possible to use the second lens 2B having the second flange back distance FB2 shorter than the first flange back distance FB1 unique to the body 10, without the replacement of the whole body-side mount 20.

Moreover, the front surface part 12 of the body 10 may be configured to avoid interference with the adapter 30 that is configured to be mounted on the first reference plane P1. In one specific example, the optical component holder 13, the second contact holder 42A, and the chassis 16 may be retreated rearward in the direction of the optical axis Z. Hence, it is possible to avoid interference with the adapter 30 that is configured to be mounted on the first reference plane P1.

Furthermore, the first contact holder 41A may be provided with the clearance C41. Hence, it is possible to avoid interference with the second lens dismounting button 35C.

(Second Embodiment)

(A) of FIG. 12 illustrates a configuration of an adapter 30 according to the second embodiment of the disclosure, as seen from front. (B) of FIG. 12 illustrates a configuration in cross-section taken along a line XIIB-XIIB in (A) of FIG. 12. FIG. 13 illustrates a configuration of the adapter 30 illustrated in FIG. 12, as seen from rear surface side. The adapter 30 according to the embodiment is different from the adapter 30 according to the forgoing first embodiment in the breech lock system adopted as the mount system of the second lens 2B. Description is therefore made, with corresponding components denoted by same references.

Similarly to the first embodiment, the adapter 30 is configured to be mounted on the first reference plane P1 of the body-side mount 20. The body-side mount 20 includes the first reference plane P1 as described, and has the first flange back distance FB1 from the first reference plane P1 to the imaging plane P11. Also, the adapter 30 includes the second reference plane P2, and has the second flange back distance FB2 from the second reference plane P2 to the imaging plane P11. The second flange back distance FB2 is shorter than the first flange back distance FB1. The second reference plane P2 may be a plane on which the second lens 2B (refer to (A) of FIG. 2) having the second flange back distance FB2 is mounted. Hence, in the camera 1, it is possible to take the second lens 2B having the second flange back distance FB2 shorter than the first flange back distance FB1 unique to the body 10, without the replacement of the whole body-side mount 20.

In one specific example, the adapter 30 may allow the second lens 2B having the second flange back distance FB2 to be mounted on the body-side mount 20 by the breech lock system. The adapter 30 may include, as illustrated in (A) and (B) of FIG. 12, the outer circumferential part 32, the inner circumferential part 33, the intermediate part 34, a fastening part 36, and a breech lock mechanism 37. The adapter 30 may have the circular-shaped aperture 33A on the inner circumferential side. The aperture diameter of the adapter 30 may be smaller than the aperture diameter of the body-side mount 20.

The outer circumferential part 32 may be a part that is configured to be mounted on the first reference plane P1 of the body-side mount 20, and may include the mounting plane 31. The mounting plane 31 may be a plane that makes contact with the first reference plane P1 when the adapter 30 is mounted on the first reference plane P1 of the body-side mount 20. The outer circumferential part 32 may include the outer tabs 32A at circumferentially-spaced three positions. The outer tabs 32A are provided for the mounting on the body-side mount 20.

The fastening part 36 may turn around the optical axis A to allow the second lens 2B to be fastened or fixed to, or removed from the adapter 30. The fastening part 36 may be fixed, with a screw 36A, to a front part of the outer circumferential part 32 in the direction of the optical axis Z. The fastening part 36 may be provided with a mounting and dismounting lever 36B. The mounting and dismounting lever 36B may be an operation lever that allows the second lens 2B to be fastened to the adapter 30 or allows the second lens 2B to be removed from the adapter 30, as illustrated in (A) of FIG. 12. The mounting and dismounting lever 36B may be provided on obliquely upper left side in a circumferential direction of the fastening part 36. Moreover, in one preferred example, the fastening part 36 may include an inclined plane 36C along a border of the inner circumferential part 33. The inclined plane 36C makes it possible to take lenses of various shapes. In addition, the inclined plane 36C may provide margin space around the mounting and dismounting lever 36B. This makes it possible for a user to easily operate the mounting and dismounting lever 36B.

The inner circumferential part 33 may be provided inside the outer circumferential part 32, concentrically with the outer circumferential part 32. The inner circumferential part 33 may include the second reference plane P2. In one preferred example, the second reference plane P2 may be positioned, in the direction of the optical axis Z, closer to the imaging plane P11 than the mounting plane 31 is. This makes it possible to allow the second lens 2B having the second flange back distance FB2 shorter than the first flange back distance FB1 unique to the body 10 to be mounted on the body-side mount 20 with the adapter 30 in between.

The breech lock mechanism 37 may be provided behind the inner circumferential part 33 in the direction of the optical axis Z, and may include inner tabs 37A at circumferentially-spaced three positions. The breech lock mechanism 37 may be fixed to the fastening part 36 by a link part 37B, and may turn around the optical axis A in accordance with turning of the fastening part 36. The link part 37B may be provided in a guide groove 32B carved along a part of the outer circumferential part 32 in a circumferential direction.

It follows, therefore, that a range of movement of the link part 37B and the fastening part 36 may be defined by the guide groove 32B.

The intermediate part 34 may be a shouldered part that couples the fastening part 36 and the outer circumferential part 32 to the inner circumferential part 33 in the direction of the optical axis Z. In one preferred example, the intermediate part 34 may include the inclined plane 34A, similarly to the first embodiment. The inclined plane 34A may link the fastening part 36 and the outer circumferential part 32 to the inner circumferential part 33.

FIGS. 14 and 15 illustrate a configuration of the adapter 30, as mounted on the body-side mount 20 illustrated in FIG. 6 and seen from front of the body-side mount 20. FIG. 14 depicts a case with the mounting and dismounting lever 36B at an initial position PI. FIG. 15 depicts a case with the mounting and dismounting lever 36B at a fastening position PT. It is to be noted that FIGS. 14 and 15 depict the fastening ring 23 that is omitted in FIG. 6.

In one preferred example, when the adapter 30 is mounted on the first reference plane P1, the first contact 41 may be hidden behind the adapter 30, while the second contact 42 may be exposed in the aperture 33A on the inner circumferential side of the adapter 30, similarly to the first embodiment. This makes it possible to allow the second contact 42 to be exposed in the aperture 33A opened on the inner circumferential side of the adapter 30 when the adapter 30 is mounted on the first reference plane P1. Hence, it is possible to easily couple the second contact 42 to the second lens 2B. Meanwhile, the first contact 41 may be hidden behind the adapter 30, allowing a user to easily and visually recognize the situation not to allow for the mounting of the first lens 2A. Hence, it is possible to avoid mistakes in lens mounting.

Moreover, in one preferred example, the fastening ring 23 may include the notch 23B provided along a part of the fastening ring 23 in the circumferential direction of the fastening ring 23, similarly to the first embodiment. For example, the notch 23B may be provided along the lower part in the circumferential direction of the fastening ring 23, as seen from front of the body-side mount 20. In one preferred example, the notch 23B may have the height in the direction of the optical axis Z that allows the notch 23B to form the same plane or the substantially same plane as the support ring 22.

The fastening ring 23 may include the rising wall 23C provided along the part other than the notch 23B, similarly to the first embodiment. In one preferred example, the rising wall 23C may have the central angle α around the optical axis A being equal to or larger than 180°, similarly to the first embodiment.

In one preferred example, a range of movement R36B of the mounting and dismounting lever 36B of the adapter 30 may be provided within the range of the rising wall 23C. The rising wall 23C may be provided along the part other than the notch 23B of the fastening ring 23. This makes it possible for a user to operate the mounting and dismounting lever 36B without causing interference with a component protruded downward from the lens barrel of the second lens 2B.

Moreover, in one preferred example, the range of movement R36B of the mounting and dismounting lever 36B of the adapter 30 may be provided on obliquely upper side in the circumferential direction of the body-side mount 20, as seen from front of the body-side mount 20. For example, the mounting and dismounting lever 36B may be provided on obliquely upper left side or on obliquely upper right side.

When the mounting and dismounting lever 36B is provided on upper side in the circumferential direction of the body-side mount 20, a user may be easily confused whether he or she should turn the mounting and dismounting lever 36B clockwise or counterclockwise to fasten the adapter 30. Meanwhile, when the mounting and dismounting lever 36B is provided on the obliquely upper side, a user may easily grasp, visually and intuitively, that he or she can fasten the adapter 30 by turning downward the mounting and dismounting lever 36B. Moreover, in many cases, the mounting and dismounting lever 36B may be operated by an assistant photographer who stands beside the camera 1 in assisting a chief photographer. The mounting and dismounting lever 36B may be, therefore, disposed on the obliquely upper side, making it easier for the assistant photographer to operate the mounting and dismounting lever 36B. This leads to enhancement in work efficiency.

In one specific and preferred example, the initial position PI of the mounting and dismounting lever 36B illustrated in FIG. 14 may be on the obliquely upper left side in the circumferential direction of the body-side mount 20 as seen from front of the body-side mount 20, while the fastening position PT of the mounting and dismounting lever 36B illustrated in FIG. 15 may be at a position where the mounting and dismounting lever 36B is turned counterclockwise CCW from the initial position PI. It is to be noted that, depending on a direction in which the fastening part 36 is turned for fastening, the initial position PI of the mounting and dismounting lever 36B may be on the obliquely upper right side, while the fastening position PT of the mounting and dismounting lever 36B may be at a position where the mounting and dismounting lever 36B is turned clockwise from the initial position PI.

FIG. 16 illustrates a configuration of the front surface part 12, the body-side mount 20, and the adapter 30 illustrated in FIG. 14, in cross-section taken in a radial direction and including the mounting and dismounting lever 36B. FIG. 17 illustrates, in an enlarged manner, a cross-sectional configuration in vicinity of the mounting and dismounting lever 36B illustrated in FIG. 16. The body-side mount 20 may include the mounting ring 21, the support ring 22, and the fastening ring 33 in the order named from the inner circumferential side, as described. The mounting surface 31 of the outer circumferential part 32 of the adapter 30 may be in contact with the first reference plane P1 of the mounting ring 21 of the body-side mount 20. The inner circumferential part 33 of the adapter 30 may intrude itself into the mounting space MS surrounded by the body-side mount 20 and the front surface part 12 of the body 10.

In the front surface part 12, the optical component 13 may be disposed facing the aperture of the inner circumferential part 33 of the adapter 30. The optical component 13 may be supported by the optical component holder 17. The optical component holder 17 may be fixed to the chassis 16 with the screws 17A and 17B (not shown in FIG. 14, refer to FIG. 6).

Here, in the optical component 13, the distance D13 (refer to (A) of FIG. 2) from the optical component 13 to the imaging plane P11 in the direction of the optical axis Z may be shortened, in order to avoid interference of the optical component 13 with the adapter 30. This corresponds to one preferred example of the design for shortening as described.

Moreover, the optical component holder 17, the chassis 16, and the second contact holder 42A may be retreated toward the imaging plane P11 in the direction of the optical axis Z. This corresponds to another preferred example of the design to avoid interference as described. The amount of retreat R12 (refer to (B) of FIG. 3) at this occasion may be adapted to avoid the interference with the adapter 30 in accordance with the difference between the first flange back distance FB1 unique to the body 10 and the second flange back distance FB2 of the adapter 30 and the second lens 2B that are to be mounted. This makes it possible to ensure margin space on the body 10 side, and to avoid interference of the adapter 30 that intrudes itself into the mounting space MS with the front surface part 12 of the body 10.

In the camera 1, the adapter 30 and the second lens 2B may be attached to the body 10, for example, as follows.

First, the outer tabs 32A of the outer circumferential part 32 of the adapter 30 may be fitted into between the tabs 22A of the support ring 22 of the body-side mount 20. Next, the fastening ring 23 may be turned in the fastening direction. This causes the outer tabs 32A of the adapter 30 to be interposed between the tabs 22A of the body-side mount 20 and the first reference plane P1. Thus, the adapter 30 may be mounted on and fixed to the first reference plane P1 of the body-side mount 20.

At this occasion, as illustrated in (A) of FIG. 2, the inner circumferential part 33 may intrude itself into the mounting space MS surrounded by the body-side mount 20 and the front surface of the body 10, with the outer circumferential part 32 mounted on the first reference plane P1 of the body-side mount 20. However, the front surface part 12 of the body 10 may be retreated rearward in the direction of the optical axis Z, in accordance with the design to avoid interference as described. Specifically, the optical component holder 13, the chassis 16, the first contact holder 41A, and the second contact holder 42A may be retreated rearward in the direction of the optical axis Z. Accordingly, the front surface part 12, i.e., the optical component holder 17, the chassis 16, the first contact holder 41A, and the second contact holder 42A may be prevented from interfering with the adapter 30 mounted on the first reference plane P1.

Thereafter, tabs (not illustrated) at the rear end of the second lens 2B may be fitted into between the inner tabs 37A of the breech lock mechanism 37 of the adapter 30. Then, the mounting and dismounting lever 36B may be moved from the initial position PI illustrated in FIG. 14 to the fastening position PT illustrated in FIG. 15. This allows the second lens 2B to be mounted on and fixed to the second reference plane P2 of the adapter 30.

At this occasion, in one preferred example, a direction of turning to release the fastening ring 23 in the body-side mount 20 may be opposite, around the optical axis A, to a direction of turning to turn the fastening part 36 and to dismount the second lens 2B from the second reference plane P2. In this way, when a user turns the fastening ring 23 of the body-side mount 20 in a direction of release of the fastening ring 23, the direction in which the user turns the fastening ring 23 may serve as, to the contrary, a direction in which the second lens 2B is fastened more tightly. Accordingly, even when a user wants to dismount the second lens 2B from the adapter 30 and mistakenly turns clockwise CW the fastening ring 23 of the body-side mount 20, instead of turning the mounting and dismounting lever 36B, nothing comes off. Meanwhile, even when a user wants to fasten the second lens 2B to the adapter 30 and mistakenly turns counterclockwise CCW the fastening ring 23 of the body-side mount 20, instead of turning the mounting and dismounting lever 36B, nothing comes off. Thus, the adapter 30 and the second lens 2B may be prevented from being unintentionally dismounted from the body-side mount 20. Hence, it is possible to enhance stability and safety in lens mounting.

As described, the embodiment adopts the breech lock system as the mount system of the second lens 2B on the adapter 30. This makes it possible to fasten the second lens 2B more robustly to the adapter 30, in addition to effects in the first embodiment. Moreover, the body-side mount 20 also adopts the breech lock system. Hence, it is possible to reduce rattling that may be caused by the use of the adapter 30.

APPLICATION EXAMPLES

In the following, description is given on application examples of the camera 1.

First Application Example

The camera 1 may be used, with the adapter 30C mounted on the body-side mount 20, for example, as illustrated in FIG. 18, and furthermore, with the third lens 2C mounted on the adapter 30C, as illustrated in FIG. 19. The adapter 30C may be an adapter for a cinematographic lens. The third lens 2C may be a cinematographic lens. Furthermore, a view finder, a recorder, a battery, or other accessories and components (neither illustrated) may be also mounted on the body 10.

The adapter 30C may convert the body-side mount 20 of the camera 1 to a PL mount that is a standard mount in film industry, and may include a third contact 43. The third contact 43 may be disposed on the upper side and on the right side in the circumferential direction of the body-side mount 20, as seen from front of the body-side mount 20. The adapter 30C and the third lens 2C have the third flange back distance FB3 (refer to (B) of FIG. 1) longer than the first flange back distance FB1 unique to the body 10. The use of the adapter 30C makes it possible to allow the third lens 2C having the third flange back distance FB3 longer than the first flange back distance FB1 to be mounted on the body-side mount 20.

Second Application Example

Alternatively, the camera 1 may be used, with the adapter 30 mounted on the body-side mount 20, as illustrated in FIG. 9 or 15, and furthermore, with the second lens 2B mounted on the adapter 30, as illustrated in FIG. 20. The adapter 30 may be an adapter according to the first embodiment or the second embodiment. The second lens 2B may be, for example, a still image photographing lens for a mirrorless camera, and may have the second flange back distance FB2 (refer to (A) of FIG. 2) shorter than the first flange back distance FB1 unique to the body 10. It is to be noted that the second lens 2B may be a lens for a single lens reflex camera or a lens that may perform photographing of both still images and moving images. Thus, the use of the adapter 30 according to the example embodiments of the disclosure makes it possible for a user of the third lens 2C that has been used in video industry to light-heartedly use the second lens 2B that has been used in photograph industry. This allows for lowering barriers between application categories such as cinematography, broadcasting, and still image photographing for consumers. Hence, it is possible for a user to easily acquire opportunities of new experiences, and to expand possibility of video expression.

MODIFICATION EXAMPLES

It is to be noted that, in the forgoing example embodiments, description is given on a case in which, as seen from front of the body-side mount 20, the first contact 41 is disposed on the left side in the circumferential direction of the body-side mount 20, while the second contact 42 is disposed on the lower side in the circumferential direction of the body-side mount 20. However, the arrangement of the first contact 41 and the second contact 42 is not limited to the example as in the forgoing example embodiments, and various modifications may be possible as in the following modification examples 1 to 4. It is to be appreciated that modification examples of the arrangement of the first contact 41 and the second contact 42 are not limited to the following modification examples 1 to 4.

Modification Example 1

For example, referring to FIG. 21, as seen from front of the body-side mount 20, the first contact 41 may be disposed on the upper side and on the right side in the circumferential direction of the body-side mount 20, while the second contact 42 may be disposed on the upper side in the circumferential direction of the body-side mount 20.

Modification Example 2

Alternatively, for example, referring to FIG. 22, as seen from front of the body-side mount 20, the first contact 41 may be disposed on the upper side and on the right side in the circumferential direction of the body-side mount 20, while the second contact 42 may be disposed on the left side in the circumferential direction of the body-side mount 20.

Modification Example 3

In another alternative, for example, referring to FIG. 23, as seen from front of the body-side mount 20, the first contact 41 may be disposed on the upper side and on the right side in the circumferential direction of the body-side mount 20, while the second contact 42 may be disposed on the obliquely lower left side in the circumferential direction of the body-side mount 20.

Modification Example 4

In addition, for example, referring to FIG. 24, as seen from front of the body-side mount 20, the first contact 41 may be disposed on the left side in the circumferential direction of the body-side mount 20, while the second contact 42 may be disposed on the upper side in the circumferential direction of the body-side mount 20.

Although description has been made by giving the example embodiments as mentioned above, the contents of the disclosure are not limited to the above-mentioned example embodiments and may be modified in a variety of ways. For example, shapes, dimensions, materials, or other properties of the components as described in the forgoing example embodiments are not limited to as exemplified above, but other shapes, dimensions, and materials may be adopted.

Moreover, for example, in the forgoing example embodiments, description has been given on specific configurations of the camera 1 and the adapter 30. However, the camera 1 and the adapter 30 are not limited to those that include all the components as described. Also, the camera 1 and the adapter 30 may further include another component or other components.

It is to be noted that effects described herein are merely exemplified and not limitative, and effects of the disclosure may be other effects or may further include other effects.

The contents of the technology may have the following configurations.

(1) A camera, including a body-side mount that includes a first reference plane, has a first flange back distance from the first reference plane to an imaging plane, and allows an adapter to be mounted on the first reference plane, the adapter including a second reference plane, and having a second flange back distance from the second reference plane to the imaging plane, the second flange back distance being shorter than the first flange back distance.

(2) The camera according to (1), wherein the second reference plane is positioned, in a direction of an optical axis, closer to the imaging plane than the first reference plane is.

(3) The camera according to (1) or (2), further including a body that includes the body-side mount and incorporates an imaging device,
wherein the body includes:
a first contact that couples a first lens to the body, the first lens being configured to be mounted on the first reference plane and having the first flange back distance; and
a second contact that couples a second lens to the body, the second lens being configured to be mounted on the second reference plane and having the second flange back distance, and
the second contact is positioned, in a radial direction of the body-side mount, more inwardly than the first contact is.

(4) The camera according to (3),
wherein the adapter has an aperture on inner circumferential side, and
the second contact is exposed in the aperture on the inner circumferential side of the adapter when the adapter is mounted on the first reference plane.

(5) The camera according to (3) or (4),
wherein the body-side mount is provided on a front surface part of the body, and
the front surface part is configured to avoid interference with the adapter that is configured to be mounted on the first reference plane.

(6) The camera according to (5), wherein the front surface part includes:
an optical component that faces the imaging device;
an optical component holder that holds the optical component;
the first contact;
a first contact holder that holds the first contact;
the second contact;
a second contact holder that holds the second contact;
a chassis that holds the optical component holder, the first contact holder, and the second contact holder.

(7) The camera according to (6),
wherein the optical component holder, the second contact holder, and the chassis are retreated toward the imaging plane in the direction of the optical axis by an amount of retreat adapted to avoid the interference with the adapter that is configured to be mounted on the first reference plane.

(8) The camera according to (6) or (7),
wherein the adapter includes:
a bayonet mechanism that supports the second lens on the second reference plane; and
a second lens dismounting button that allows the second lens to be dismounted from the second reference plane, and
the first contact holder includes a clearance positioned to face the second lens dismounting button when the adapter is mounted on the first reference plane, the clearance being retreated toward the imaging plane in the direction of the optical axis by an amount of retreat adapted to avoid interference with the second lens dismounting button.

(9) The camera according to (8), wherein the second lens dismounting button is protruded, in the direction of the optical axis, toward the second lens from a front surface of the outer circumferential part.

(10) The camera according to (8) or (9), wherein the body-side mount includes a fastening ring that allows the first lens or the adapter to be mounted on and dismounted from the first reference plane by a breech lock system, the fastening ring includes:

a notch provided along a part of the fastening ring in a circumferential direction; and a rising wall provided along a part other than the notch, and the second lens dismounting button is provided within a range of the notch.

(11) The camera according to any one of (3) to (7), wherein the adapter includes:

a fastening part configured to turn around the optical axis;

a mounting and dismounting lever provided in the fastening part; and a breech lock mechanism configured to turn around the optical axis accompanying the turning of the fastening part, the body-side mount includes a fastening ring that allows the first lens or the adapter to be mounted on and dismounted from the first reference plane by a breech lock system, the fastening ring includes:

a notch provided along a part of the fastening ring in a circumferential direction; and a rising wall provided along a part other than the notch, and a range of movement of the mounting and dismounting lever is provided within a range of the rising wall.

(12) The camera according to (11), wherein the range of movement of the mounting and dismounting lever is provided on obliquely upper left side or obliquely upper right side in a circumferential direction of the body-side mount, as seen from front of the body-side mount.

(13) The camera according to (12), wherein an initial position of the mounting and dismounting lever is on obliquely upper left side in the circumferential direction of the body-side mount, as seen from front of the body-side mount, and a fastening position of the mounting and dismounting lever is at a position where the mounting and dismounting lever is turned counterclockwise from the initial position.

(14) The camera according to any one of (11) to (13), wherein a direction of turning to release the fastening ring in the body-side mount is opposite, around the optical axis, to a direction of turning to dismount the second lens from the second reference plane.

(15) The camera according to any one of (3) to (14), wherein the first contact and the second contact are disposed at different positions in a circumferential direction of the body-side mount, as seen from front of the body-side mount.

(16) The camera according to any one of (3) to (15), wherein, as seen from front of the body-side mount, the first contact is disposed on upper side and on right side in a circumferential direction of the body-side mount, while the second contact is disposed on the upper side in a circumferential direction of the body-side mount.

(17) The camera according to any one of (3) to (15), wherein, as seen from front of the body-side mount, the first contact is disposed on upper side and on right side in a circumferential direction of the body-side mount, while the second contact is disposed on lower side or on obliquely lower left side in a circumferential direction of the body-side mount.

(18) The camera according to any one of (3) to (15), wherein, as seen from front of the body-side mount, the first contact is disposed on left side in a circumferential direction of the body-side mount, while the second contact is disposed on lower side in a circumferential direction of the body-side mount.

(19) The camera according to any one of (3) to (15), wherein, as seen from front of the body-side mount, the first contact is disposed on left side in a circumferential direction of the body-side mount, while the second contact is disposed on upper side in a circumferential direction of the body-side mount.

(20) An adapter configured to be mounted on a first reference plane of a body-side mount, the body-side mount including the first reference plane, and having a first flange back distance from the first reference plane to an imaging plane, the adapter including a second reference plane, and having a second flange back distance from the second reference plane to the imaging plane, the second flange back distance being shorter than the first flange back distance.

(21) The adapter according to (20), wherein the second reference plane is positioned, in a direction of an optical axis, closer to the imaging plane than the first reference plane is.

(22) The adapter according to (20) or (21), wherein the adapter includes:

an outer circumferential part that is configured to be mounted on the first reference plane of the body-side mount; and an inner circumferential part that is provided inside the outer circumferential part, concentrically with the outer circumferential part, includes the second reference plane, and is configured to intrude itself into a mounting space surrounded by the body-side mount and a front surface of the body when the outer circumferential part is mounted on the first reference plane.

(23) The adapter according to (22), wherein the adapter further includes an intermediate part between the outer circumferential part and the inner circumferential part.

(24) The adapter according to (23), wherein the intermediate part includes an inclined plane that links the outer circumferential part and the inner circumferential part together.

This application claims the benefit of Japanese Priority Patent Application JP 2014-15452 filed on Jan. 30, 2014 the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A camera, comprising:

a body, the body comprising:

an imaging device;

a body-side mount that includes a first reference plane;

a first contact in a first region inside the body-side mount, wherein the first contact is configured to couple a first lens to the body, and wherein the first lens is configured to be mounted on the first reference plane; and
a second contact in a second region inside the body-side mount, wherein the second contact is configured to couple a second lens to the body,
wherein the second contact is more inward in the body-side mount than the first contact in a direction of an optical axis of the first lens,
wherein the body has a first flange back distance from the first reference plane to an imaging plane and the first lens corresponds to the first flange back distance,
wherein the body-side mount is configured to mount an adapter on the first reference plane,
wherein the adapter includes a second reference plane and has a second flange back distance from the second reference plane to the imaging plane,
wherein the second flange back distance is shorter than the first flange back distance, and
wherein the second lens is configured to be mounted on the second reference plane and corresponds to the second flange back distance.

2. The camera according to claim 1, wherein the second reference plane is closer to the imaging plane than the first reference plane in the direction of the optical axis.

3. The camera according to claim 1, wherein the adapter comprises an inner circumferential part,
wherein the inner circumferential part comprises an aperture, and
wherein the second contact is exposed in the aperture on the inner circumferential part of the adapter in a state the adapter is mounted on the first reference plane.

4. The camera according to claim 1, wherein the body-side mount is on a front surface part of the body, and the front surface part is configured to avoid interference with the adapter configured to be mounted on the first reference plane.

5. The camera according to claim 4, wherein the front surface part includes:
an optical component configured to face the imaging device;
an optical component holder configured to hold the optical component;
the first contact;
a first contact holder configured to hold the first contact;
the second contact;
a second contact holder configured to hold the second contact; and
a chassis configured to hold the optical component holder, the first contact holder, and the second contact holder.

6. The camera according to claim 5, wherein the optical component holder, the second contact holder, and the chassis are configured to retreat toward the imaging plane in the direction of the optical axis by an amount of retreat adapted to avoid an interference with the adapter configured to be mounted on the first reference plane.

7. The camera according to claim 5, wherein the adapter includes:
a bayonet mechanism configured to support the second lens on the second reference plane; and
a second lens dismounting button configured to allow the second lens to be dismounted from the second reference plane, and wherein the first contact holder includes a clearance that faces the second lens dismounting button in a state the adapter is mounted on the first reference plane,
wherein a part of the first contact holder is configured to retreat toward the imaging plane in the direction of the optical axis in the clearance, and
wherein an amount of retreat is adapted to avoid interference of the part of the first contact holder with the second lens dismounting button.

8. The camera according to claim 7, wherein the second lens dismounting button is protruded, in the direction of the optical axis, toward the second lens from a front surface of an outer circumferential part of the adapter.

9. The camera according to claim 7, wherein the body-side mount further includes
a fastening ring configured to allow at least one of the first lens or the adapter to be mounted on and dismounted from the first reference plane by a breech lock system,
wherein the fastening ring includes:
a notch along a first part of the fastening ring in a circumferential direction of the fastening ring; and
a rising wall along a second part of the fastening ring in the circumferential direction of the fastening ring, wherein the second part is different from the first part, and
wherein the second lens dismounting button is within a first range of the notch.

10. The camera according to claim 1,
wherein the adapter further includes:
a fastening part configured to turn around the optical axis;
a mounting and dismounting lever in the fastening part; and
a breech lock mechanism configured to turn around the optical axis to accompany turning of the fastening part,
wherein the body-side mount further includes
a fastening ring configured to allow at least one of the first lens or the adapter to be mounted on and dismounted from the first reference plane by the breech lock mechanism,
wherein the fastening ring includes:
a notch along a first part of the fastening ring in a circumferential direction of the fastening ring; and
a rising wall along a second part of the fastening ring in the circumferential direction of the fastening ring, wherein the second part is different from the first part, and
wherein a range of movement of the mounting and dismounting lever is within a second range of the rising wall.

11. The camera according to claim 10, wherein the range of movement of the mounting and dismounting lever is on one of an obliquely upper left side or an obliquely upper right side in a circumferential direction of the body-side mount, as seen from a front of the body-side mount.

12. The camera according to claim 11, wherein an initial position of the mounting and dismounting lever is on the obliquely upper left side in the circumferential direction of the body-side mount, as seen from the front of the body-side mount, and a fastening position of the mounting and dismounting lever is at a position where the mounting and dismounting lever is turned counterclockwise from the initial position.

13. The camera according to claim 10, wherein a first direction of turning around the optical axis to release the fastening ring in the body-side mount is opposite to a second direction of turning around the optical axis to dismount the second lens from the second reference plane.

14. The camera according to claim 1, wherein the first contact and the second contact are at different positions in a circumferential direction of the body-side mount, as seen from a front of the body-side mount.

15. The camera according to claim 1, wherein, as seen from a front of the body-side mount, the first contact is on an upper side and on a right side in a circumferential direction of the body-side mount and the second contact is on the upper side in the circumferential direction of the body-side mount.

16. The camera according to claim 1, wherein, as seen from a front of the body-side mount, the first contact is on an upper side and on a right side in a circumferential direction of the body-side mount and the second contact is on one of a lower side or on an obliquely lower left side in the circumferential direction of the body-side mount.

17. The camera according to claim 1, wherein, as seen from a front of the body-side mount, the first contact is on a left side in a circumferential direction of the body-side mount and the second contact is on a lower side in the circumferential direction of the body-side mount.

18. The camera according to claim 1, wherein, as seen from a front of the body-side mount, the first contact is on a left side in a circumferential direction of the body-side mount and the second contact is on an upper side in the circumferential direction of the body-side mount.

19. An adapter, comprising:
a second reference plane and having a second flange back distance from the second reference plane to an imaging plane,
wherein the adapter is configured to be mounted on a first reference plane of a body-side mount,
wherein the body-side mount has a first flange back distance from the first reference plane to the imaging plane,
wherein the second flange back distance is shorter than the first flange back distance,
wherein a first contact is in a first region inside the body-side mount, wherein the first contact is configured to couple a first lens to a body of a camera, wherein the first lens is configured to be mounted on the first reference plane, and wherein the first lens corresponds to the first flange back distance,
wherein a second contact is in a second region inside the body-side mount, wherein the second contact is configured to couple a second lens to the body, and wherein the second lens is configured to be mounted on the second reference plane and corresponds to the second flange back distance, and
wherein the second contact is more inward in the body-side mount than the first contact in a direction of an optical axis of the first lens.

* * * * *